(12) United States Patent
Matsumoto et al.

(10) Patent No.: US 7,489,450 B2
(45) Date of Patent: Feb. 10, 2009

(54) LENS UNIT AND AN IMAGE-SENSING APPARATUS THEREWITH

(75) Inventors: Hiroyuki Matsumoto, Wakayama (JP); Yasushi Yamamoto, Kishiwada (JP); Atsuo Masui, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 555 days.

(21) Appl. No.: 11/210,142

(22) Filed: Aug. 23, 2005

(65) Prior Publication Data

US 2006/0262420 A1 Nov. 23, 2006

(30) Foreign Application Priority Data

May 19, 2005 (JP) ............................... 2005-147302

(51) Int. Cl.
*G02B 15/14* (2006.01)
*G02B 17/00* (2006.01)

(52) U.S. Cl. ..................................... 359/687; 359/726
(58) Field of Classification Search ................ 359/686, 359/687, 726
See application file for complete search history.

(56) References Cited

U.S. PATENT DOCUMENTS 7,330,317 B2 * 2/2008 Onishi et al. ................ 359/697

FOREIGN PATENT DOCUMENTS

JP 8-248318 A 9/1996

* cited by examiner

*Primary Examiner*—William C Choi
(74) *Attorney, Agent, or Firm*—Sidley Austin LLP

(57) ABSTRACT

In a lens unit including a plurality of lens groups, the first, most object-side lens group includes a prism that changes the optical axis. In this lens unit, during zooming, while the first lens group is kept stationary, an image-sensing device is moved along the optical axis.

8 Claims, 11 Drawing Sheets

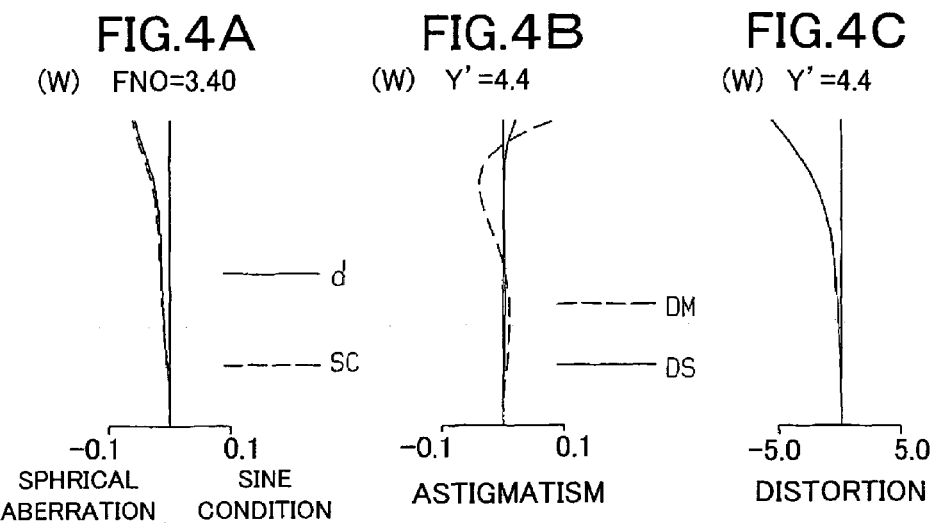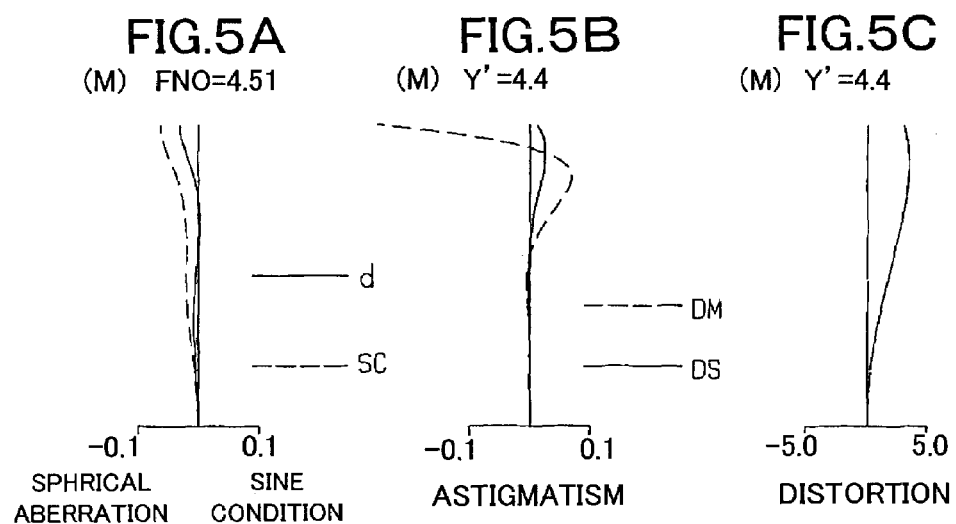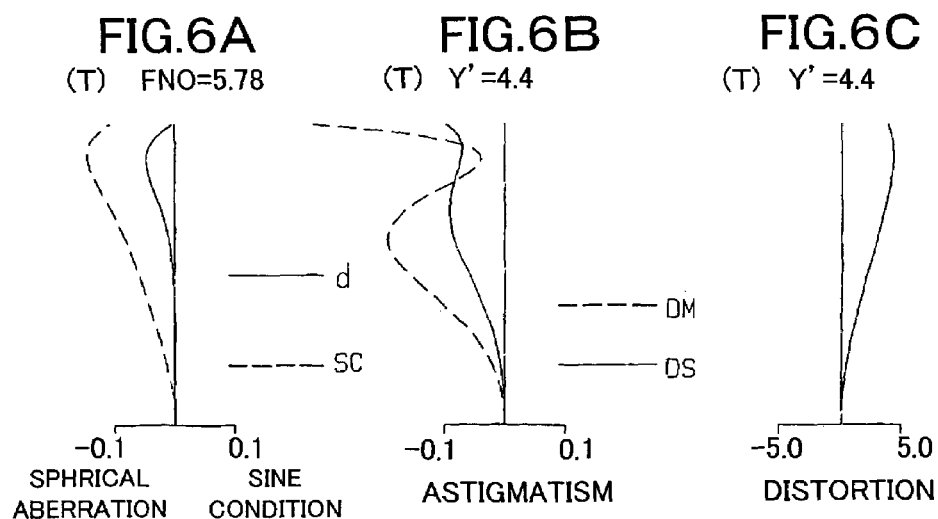

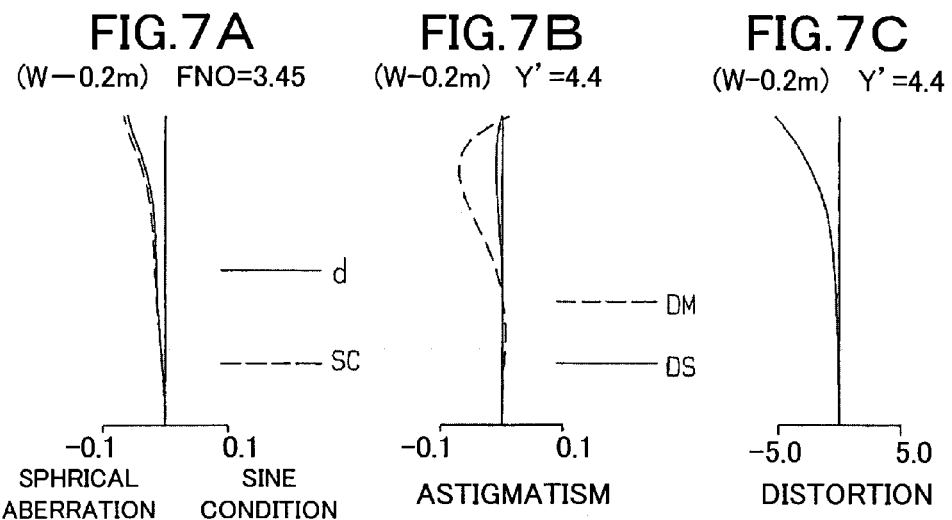
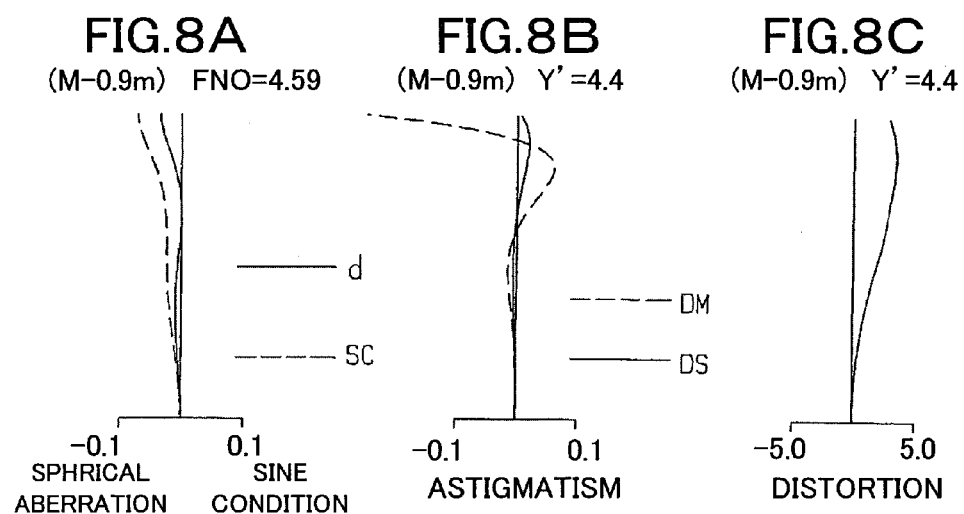
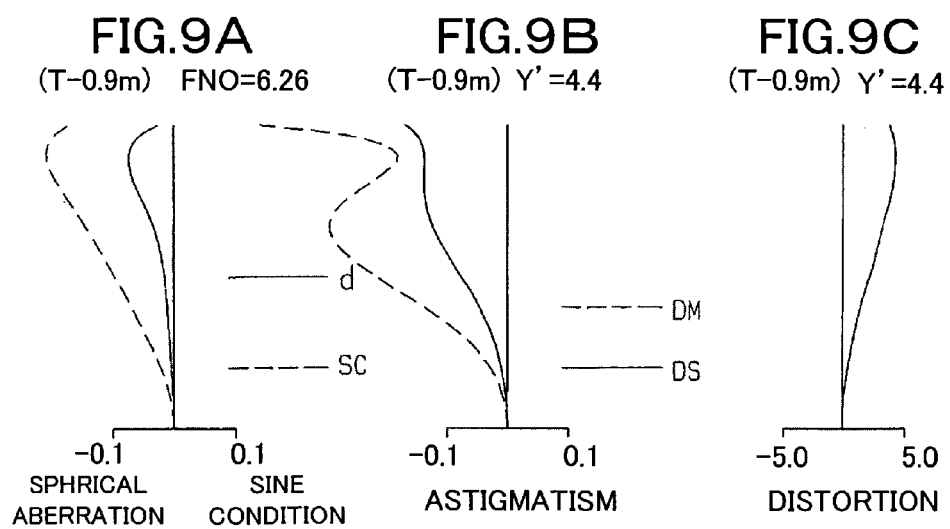

(W) FNO=2.57

-0.1  0.1
SPHRICAL  SINE
ABERRATION  CONDITION

— d
---- SC (W) Y'=3.3

-0.1  0.1
ASTIGMATISM

---- DM
—— DS (W) Y'=3.3

-5.0  5.0
DISTORTION (M) FNO=3.24

-0.1  0.1
SPHRICAL  SINE
ABERRATION  CONDITION

— d
---- SC (M) Y'=3.3

-0.1  0.1
ASTIGMATISM

---- DM
—— DS (M) Y'=3.3

-5.0  5.0
DISTORTION (T) FNO=4.05

-0.1  0.1
SPHRICAL  SINE
ABERRATION  CONDITION

— d
---- SC (T) Y'=3.3

-0.1  0.1
ASTIGMATISM

---- DM
—— DS (T) Y'=3.3

-5.0  5.0
DISTORTION

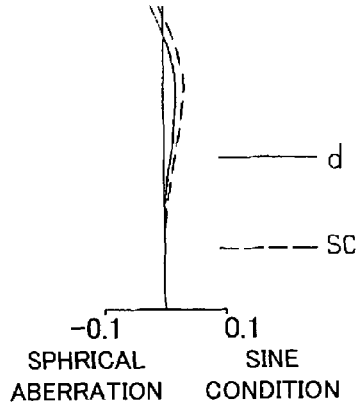
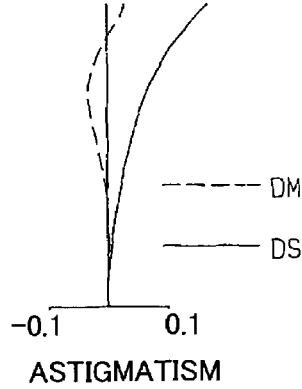
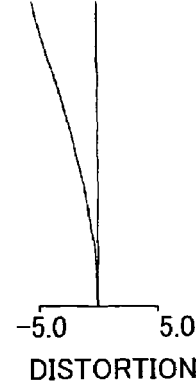
FIG.14A (W−0.23m) FNO=2.59
FIG.14B (W−0.23m) Y'=3.3
FIG.14C (W−0.23m) Y'=3.3
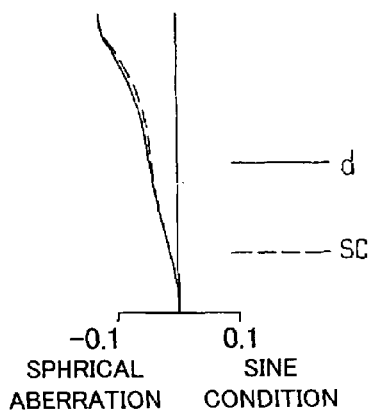
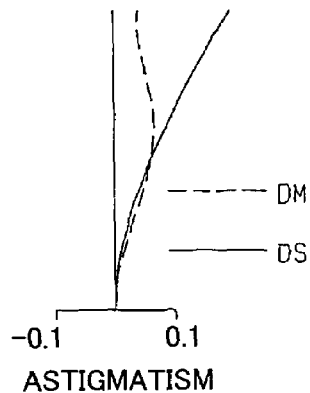
FIG.15A (M−0.23m) FNO=3.29
FIG.15B (M−0.23m) Y'=3.3
FIG.15C (M−0.23m) Y'=3.3
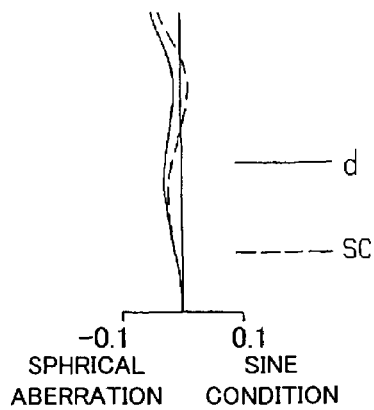
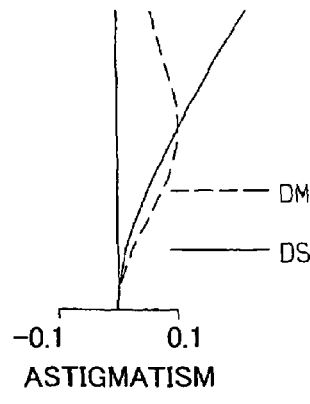
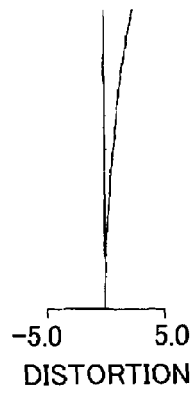
FIG.16A (T−2.35m) FNO=4.07
FIG.16B (T−2.35m) Y'=3.3
FIG.16C (T−2.35m) Y'=3.3

(W)  FNO=2.85

— d
---- SC

-0.1      0.1
SPHRICAL    SINE
ABERRATION  CONDITION (W)  Y'=3.6

---- DM
—— DS

-0.1      0.1
ASTIGMATISM (W)  Y'=3.6

-5.0      5.0
DISTORTION (M)  NO=3.90

— d
---- SC

-0.1      0.1
SPHRICAL    SINE
ABERRATION  CONDITION (M)  Y'=3.6

---- DM
—— DS

-0.1      0.1
ASTIGMATISM (M)  Y'=3.6

-5.0      5.0
DISTORTION (T)  FNO=4.82

— d
---- SC

-0.1      0.1
SPHRICAL    SINE
ABERRATION  CONDITION (T)  Y'=3.6

---- DM
—— DS

-0.1      0.1
ASTIGMATISM (T)  Y'=3.6

-5.0      5.0
DISTORTION

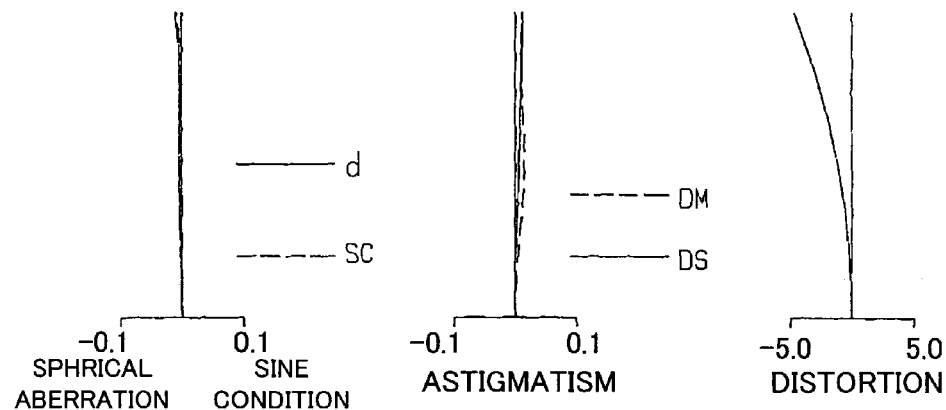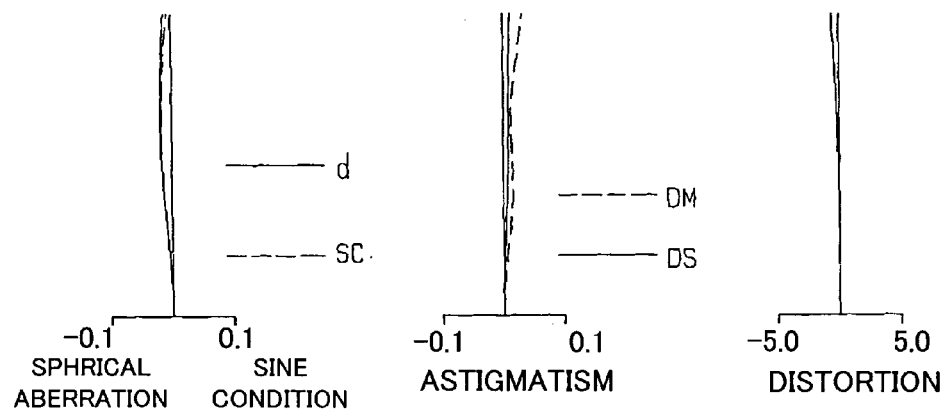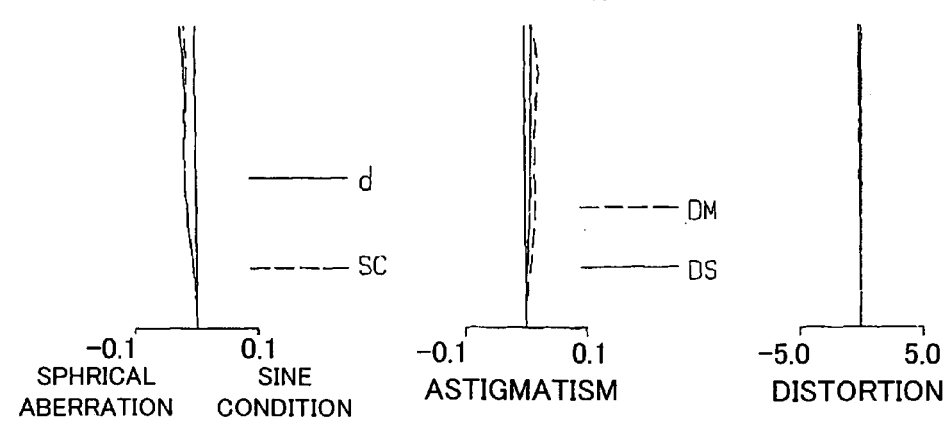

LENS UNIT AND AN IMAGE-SENSING APPARATUS THEREWITH

This application is based on Japanese Patent Application No. 2005-147302 filed on May 19, 2005, the contents of which are hereby incorporated by reference.

BACKGROUND OF THE INVENTION

1. Field of the Invention

The present invention relates to a lens unit incorporating, for example, a variable-magnification optical system, and to an image-sensing apparatus incorporating such a lens unit.

2. Description of Related Art

In recent years, digital cameras, which use an image-sensing device such as a CCD (charge-coupled device) to convert an optical image into an electrical signal, have been becoming increasingly popular. As with cameras using silver-halide film (silver-halide film cameras), such digital cameras too are required to be compact and have a simple construction.

Many variable-magnification optical systems (such as zoom lenses) for use in digital cameras and the like include four lens groups respectively having a positive, a negative, a positive, and a positive optical power (refractive power) from the object side. In such variable-magnification optical systems, the first lens group, i.e., the most object-side one, is often kept stationary during magnification variation (zooming) or the like, because this helps simplify the construction. An example of such a construction is disclosed in Japanese Patent Application Laid-open No. H08-248318, laid-open on Sep. 27, 1996 (hereinafter Patent Publication 1).

Disadvantageously, keeping the first lens group stationary as in the zoom lens proposed in Patent Publication 1 tends to give a zoom lens an unduly great total length or an unduly large lens (for example, front lens) diameter. This tendency can be overcome by adopting a magnification variation method that requires the first lens group to be moved. This method certainly contributes to giving a zoom lens a satisfactorily small total length and a satisfactorily small lens diameter, but requires a complicate construction.

To overcome this drawback, the zoom lens proposed in Patent Publication 1 attempts to achieve compactness in lens diameter and the like by adopting a magnification variation method that, while keeping the first lens group stationary, lets the fourth lens group, i.e., the most image-side one, move, or by bending the optical axis with a rectangular prism provided within the first lens group.

However, with this magnification variation method alone, i.e., simply by letting the fourth, most image-side lens group move while keeping the first lens group stationary, it is impossible to attain compactness in lens diameter and the like beyond a certain limit.

SUMMARY OF THE INVENTION

In view of the conventionally encountered inconveniences described above, it is an object of the present invention to provide a lens unit that is compact in terms of the lens diameter of the constituent lens groups thereof and the size of the prism used therein, and to provide a compact image-sensing apparatus incorporating such a lens unit.

To achieve the above object, according to one aspect of the present invention, a lens unit is provided with: a variable-magnification optical system including a plurality of lens groups; and an image-sensing device that receives the light having passed through the variable-magnification optical system. Here, of the plurality of lens groups, the most object-side lens group may include an optical axis changing member that changes the optical axis.

In the lens unit according to the present invention, it is preferable that, during magnification variation, while the most object-side lens group is kept stationary, the image-sensing device be moved along the optical axis.

Magnification variation performed as described above by moving an image-sensing device while keeping a lens group stationary requires a construction similar to one required by magnification variation performed by keeping an image-sensing device stationary while moving a lens group. This is because, in relative terms, keeping an image-sensing device stationary while moving a lens group is equivalent to moving an image-sensing device while keeping a lens group stationary.

Thus, in the lens unit according to the present invention, magnification variation is achieved by moving the image-sensing device. This reduces the need for the most object-side lens group to be moved out toward the shooting target (to the object side). Thus, the most object-side lens group no longer needs to receive light at comparatively wide angles, and thus the lens diameters (such as the front lens diameter) of the lens elements included in the most object-side lens group, which is kept stationary, can be made comparatively small.

Moreover, in the lens unit according to the present invention, the most object-side lens group, which is kept stationary, includes an optical axis changing member. Thus, this optical axis changing member (for example, an optical prism or a reflective mirror) also no longer needs to receive light at comparatively wide angles, and thus the optical axis changing member can be made comparatively small.

As described above, in the lens unit according to the present invention, the most object-side lens group is kept stationary, and thus the lens diameters (such as the front lens diameter) of the lens elements included therein can be made comparatively small, and the optical axis changing member provided therein can be made comparatively compact.

According to another aspect of the present invention, a lens unit is provided with: a variable-magnification optical system including a plurality of lens groups including at least a most object-side lens group, a most image-side lens group, and an intermediate lens group including at least one lens group located between the most object-side and most image-side lens groups; and an image-sensing device that receives the light having passed through the variable-magnification optical system. Here, within the intermediate lens group, at least one lens group may include an optical axis changing member that changes the optical axis.

In the lens unit according to the present invention, it is preferable that, during magnification variation, while the lens group including the optical axis changing member is kept stationary, the image-sensing device be moved along the optical axis.

As already described, in the lens unit according to the present invention, magnification variation is achieved by moving the image-sensing device. This reduces the need for the intermediate lens group to be moved out toward the shooting target (to the object side). Thus, the intermediate lens group no longer needs to receive light at comparatively wide angles, and thus the lens diameters of the lens elements included in any stationary lens group within the intermediate lens group can be made comparatively small.

Moreover, in the lens unit according to the present invention, a stationary lens group within the intermediate lens group includes an optical axis changing member. Thus, the optical axis changing member can be made comparatively small.

As compared with the light that enters the most objective-side lens group, the light that enters the intermediate lens group, which is located farther from the object side, often has a smaller beam diameter. Thus, the optical axis changing member provided in the stationary lens group only has to receive light having a small beam diameter. This helps make the optical axis changing member still more compact.

According to still another aspect of the present invention, a lens unit is provided with: a variable-magnification optical system including a plurality of lens groups including at least a most object-side lens group, a most image-side lens group, and an intermediate lens group including at least one lens group located between the most object-side and most image-side lens groups; and an image-sensing device that receives the light having passed through the variable-magnification optical system. Here, the most object-side lens group and, within the intermediate lens group, at least one lens group may each include an optical axis changing member that changes the optical axis.

In the lens unit according to the present invention, it is preferable that, during magnification variation, while the lens groups including the optical axis changing members, namely the most object-side lens group and at least one lens group within the intermediate lens group, are kept stationary, the image-sensing device be moved along the optical axis.

In the lens unit constructed in this way, the lens diameters of the lens elements included in the most objective-side lens group and of those included in the stationary lens group within the intermediate lens group can be made comparatively small, and the optical axis changing members provided in those lens groups (the most objective-side lens group and the stationary lens group within the intermediate lens group) can be made comparatively compact.

As described above, in any lens unit according to the present invention, the lens diameters (such as the front lens diameter) of the lens elements included in any stationary lens group (the most objective-side lens group and any stationary lens group within the intermediate lens group) can be made comparatively small, and the optical axis changing member provided in any such lens group can be made comparatively compact.

In any of the above-described lens units according to the present invention, magnification variation is achieved by moving the image-sensing device. Thus, with these lens units, magnification variation can be performed without moving, for example, the most objective-side lens group including an optical axis changing member. Thus, in the lens units according to the present invention, the lens diameters (such as the front lens diameter) of the lens elements included in, for example, the most objective-side lens group can be made comparatively small, and the optical axis changing member provided therein can be made comparatively compact.

This and other objects and features of the present invention will become clear from the following description of preferred embodiments with reference to the accompanying drawings.

BRIEF DESCRIPTION OF THE DRAWINGS

FIG. 4A is a diagram showing the spherical aberration observed in the variable-magnification optical system (Example 1) at the wide-angle end position (W);

FIG. 4B is a diagram showing the astigmatism observed in the variable-magnification optical system (Example 1) at the wide-angle end position (W);

FIG. 4C is a diagram showing the distortion observed in the variable-magnification optical system (Example 1) at the wide-angle end position (W);

FIG. 5A is a diagram showing the spherical aberration observed in the variable-magnification optical system (Example 1) at the middle focal length position (M);

FIG. 5B is a diagram showing the astigmatism observed in the variable-magnification optical system (Example 1) at the middle focal length position (M);

FIG. 5C is a diagram showing the distortion observed in the variable-magnification optical system (Example 1) at the middle focal length position (M);

FIG. 6A is a diagram showing the spherical aberration observed in the variable-magnification optical system (Example 1) at the telephoto end position (T);

FIG. 6B is a diagram showing the astigmatism observed in the variable-magnification optical system (Example 1) at the telephoto end position (T);

FIG. 6C is a diagram showing the distortion observed in the variable-magnification optical system (Example 1) at the telephoto end position (T);

FIG. 7A is a diagram showing the spherical aberration observed in the variable-magnification optical system (Example 1) at the wide-angle end position (W), when focused at the closest shootable distance;

FIG. 7B is a diagram showing the astigmatism observed in the variable-magnification optical system (Example 1) at the wide-angle end position (W), when focused at the closest shootable distance;

FIG. 7C is a diagram showing the distortion observed in the variable-magnification optical system (Example 1) at the wide-angle end position (W), when focused at the closest shootable distance;

FIG. 8A is a diagram showing the spherical aberration observed in the variable-magnification optical system (Example 1) at the middle focal length position (M), when focused at the closest shootable distance;

FIG. 8B is a diagram showing the astigmatism observed in the variable-magnification optical system (Example 1) at the middle focal length position (M), when focused at the closest shootable distance;

FIG. 8C is a diagram showing the distortion observed in the variable-magnification optical system (Example 1) at the middle focal length position (M), when focused at the closest shootable distance;

FIG. 9A is a diagram showing the spherical aberration observed in the variable-magnification optical system (Example 1) at the telephoto end position (T), when focused at the closest shootable distance;

FIG. 9B is a diagram showing the astigmatism observed in the variable-magnification optical system (Example 1) at the telephoto end position (T), when focused at the closest shootable distance;

FIG. 9C is a diagram showing the distortion observed in the variable-magnification optical system (Example 1) at the telephoto end position (T), when focused at the closest shootable distance;

FIG. 14A is a diagram showing the spherical aberration observed in the variable-magnification optical system (Example 2) at the wide-angle end position (W), when focused at the closest shootable distance;

FIG. 14B is a diagram showing the astigmatism observed in the variable-magnification optical system (Example 2) at the wide-angle end position (W), when focused at the closest shootable distance;

FIG. 14C is a diagram showing the distortion observed in the variable-magnification optical system (Example 2) at the wide-angle end position (W), when focused at the closest shootable distance;

FIG. 15A is a diagram showing the spherical aberration observed in the variable-magnification optical system (Example 2) at the middle focal length position (M), when focused at the closest shootable distance;

FIG. 15B is a diagram showing the astigmatism observed in the variable-magnification optical system (Example 2) at the middle focal length position (M), when focused at the closest shootable distance;

FIG. 15C is a diagram showing the distortion observed in the variable-magnification optical system (Example 2) at the middle focal length position (M), when focused at the closest shootable distance;

FIG. 16A is a diagram showing the spherical aberration observed in the variable-magnification optical system (Example 2) at the telephoto end position (T), when focused at the closest shootable distance;

FIG. 16B is a diagram showing the astigmatism observed in the variable-magnification optical system (Example 2) at the telephoto end position (T), when focused at the closest shootable distance;

FIG. 16C is a diagram showing the distortion observed in the variable-magnification optical system (Example 2) at the telephoto end position (T), when focused at the closest shootable distance;

FIG. 21A is a diagram showing the spherical aberration observed in the variable-magnification optical system (Example 3) at the wide-angle end position (W), when focused at the closest shootable distance;

FIG. 21B is a diagram showing the astigmatism observed in the variable-magnification optical system (Example 3) at the wide-angle end position (W), when focused at the closest shootable distance;

FIG. 21C is a diagram showing the distortion observed in the variable-magnification optical system (Example 3) at the wide-angle end position (W), when focused at the closest shootable distance;

FIG. 22A is a diagram showing the spherical aberration observed in the variable-magnification optical system (Example 3) at the middle focal length position (M), when focused at the closest shootable distance;

FIG. 22B is a diagram showing the astigmatism observed in the variable-magnification optical system (Example 3) at the middle focal length position (M), when focused at the closest shootable distance;

FIG. 22C is a diagram showing the distortion observed in the variable-magnification optical system (Example 3) at the middle focal length position (M), when focused at the closest shootable distance;

FIG. 23A is a diagram showing the spherical aberration observed in the variable-magnification optical system (Example 3) at the telephoto end position (T), when focused at the closest shootable distance;

FIG. 23B is a diagram showing the astigmatism observed in the variable-magnification optical system (Example 3) at the telephoto end position (T), when focused at the closest shootable distance; and FIG. 23C is a diagram showing the distortion observed in the variable-magnification optical system (Example 3) at the telephoto end position (T), when focused at the closest shootable distance.

DETAILED DESCRIPTION OF PREFERRED EMBODIMENTS

Embodiment 1

An embodiment (Embodiment 1) of the present invention will be described below with reference to the drawings.

1. Digital Camera

Figure 2:
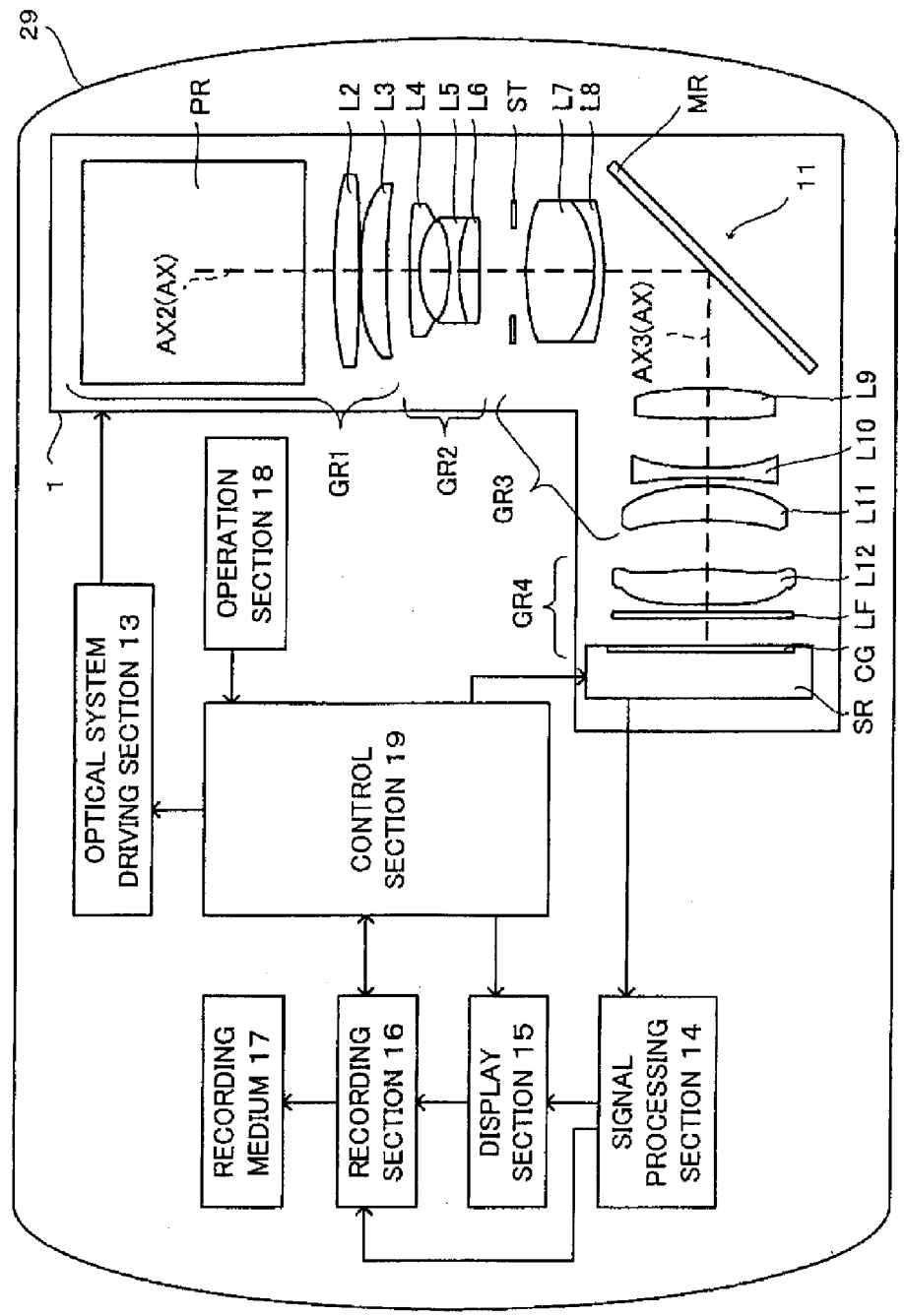
FIG. 2 is a diagram schematically showing the construction, as seen from behind, of a digital camera embodying the present invention.
Figure 3:
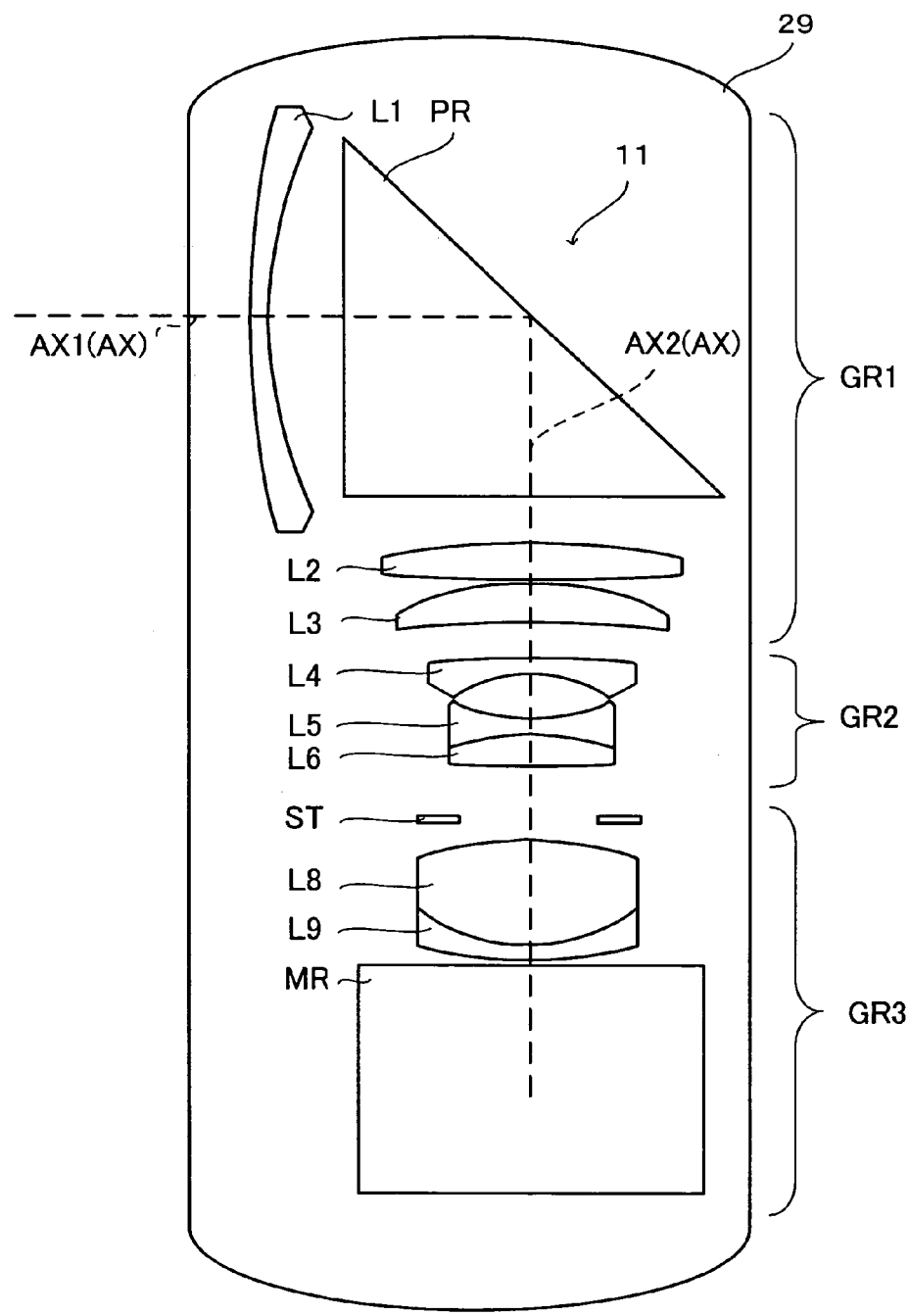
FIG. 3 is a diagram schematically showing the construction, as seen from a side, of a digital camera embodying the present invention.

FIGS. 2 and 3 are diagrams schematically showing the construction of a digital camera 29 taken up as an example of an image-sensing apparatus according to the present invention. FIG. 2 shows the interconnection among individual internal blocks, and also shows a lens unit 1 incorporated in the digital camera 29. On the other hand, FIG. 3 is a side view of the digital camera 29, and shows, in particular, a variable-magnification optical system 11 included in the lens unit 1.

As shown in FIG. 2, the digital camera 29 includes: a variable-magnification optical system 11; an optical system driving section 13; an image-sensing device SR; a signal processing section 14; a display section 15; a recording section 16; a recording medium 17; an operation section 18; and a control section 19. Here, the variable-magnification optical system 11 and the image-sensing device SR taken together are referred to as the lens unit 1.

The variable-magnification optical system 11 directs the light from the shooting target to the image-sensing device SR in such a way that the light is focused on the light-receiving surface (image-sensing surface) of the image-sensing device SR. Hence, the variable-magnification optical system 11 may be called an image-forming or image-taking optical system. The variable-magnification optical system 11 will be described in detail later.

The optical system driving section 13 includes several driving motors (optical system driving motors) and transmission mechanisms (optical system transmission mechanisms) for transmitting the driving force of the motors to the lens groups constituting the variable-magnification optical system 11 (the driving motors and transmission mechanisms are not illustrated). By using these driving motors and transmission mechanisms, the optical system driving section 13 sets the focal length or focal position of the variable-magnification optical system 11. Specifically, the optical system driving section 13 sets the focal length or focal position according to instructions from the control section 19.

The image-sensing device SR is, for example, a CCD (charge-coupled device) area sensor or a CMOS (complementary metal oxide semiconductor) sensor. The image-sensing device SR receives the light that has passed through the variable-magnification optical system 11, and converts it into an electrical signal (sensed data). The image-sensing device SR then feeds the sensed data to the signal processing section 14.

The signal processing section 14 processes the electronic data (sensed data) from the image-sensing device SR, and produces, based on the sensed data, sensed-image data. The signal processing section 14 starts and stops its processing according to instructions from the control section 19. Moreover, according to instructions from the control section 19, the signal processing section 14 feeds the sensed-image data to the display section 15 and to the recording section 16.

The display section 15 is built with, for example, a liquid crystal display panel. The display section 15 displays the sensed-image data from the signal processing section 14, the status of use of the digital camera 29, and other indications and information.

The recording section 16 records the sensed-image data produced by the signal processing section 14 to the recording medium 17 according to instructions from the control section 19. Moreover, according to instructions from the control section 19 based on how the operation section 18 and other parts are operated, the recording section 16 reads sensed-image data from the recording medium 17.

The recording medium 17 may be, for example, of the type that is unremovably built in the digital camera 29 or, like a flash memory, of the type that is removably loaded in the digital camera 29. The only requirement about the recording medium 17 is that it is a medium (such as an optical disk or semiconductor memory) that permits sensed-image data and other data to be recorded thereto.

The operation section 18 accepts various kinds of operation and instructions from the user or the like, and then feeds them to the control section 19. The operation section 18 includes, for example, a shutter release button and an operation dial.

The control section 19 functions as a control center that controls the operation of the digital camera 29 as a whole. Thus, the control section 19 centrally controls the operation of the digital camera 29 by controlling the driving of the individual members thereof in an organized manner.

2. Lens Unit

Now, the lens unit 1, which includes the variable-magnification optical system 11 and the image-sensing device SR, according to the present invention will be described with reference to FIGS. 1 to 3. As shown in FIGS. 2 and 3, the lens unit 1 is housed inside the digital camera 29. The lens unit 1 is so designed that the light beam that passes therethrough is bent with an optical prism PR or a reflective mirror MR. The optical axis of the lens unit 1 is represented by AX (AX1 to AX3).

Figure 1:
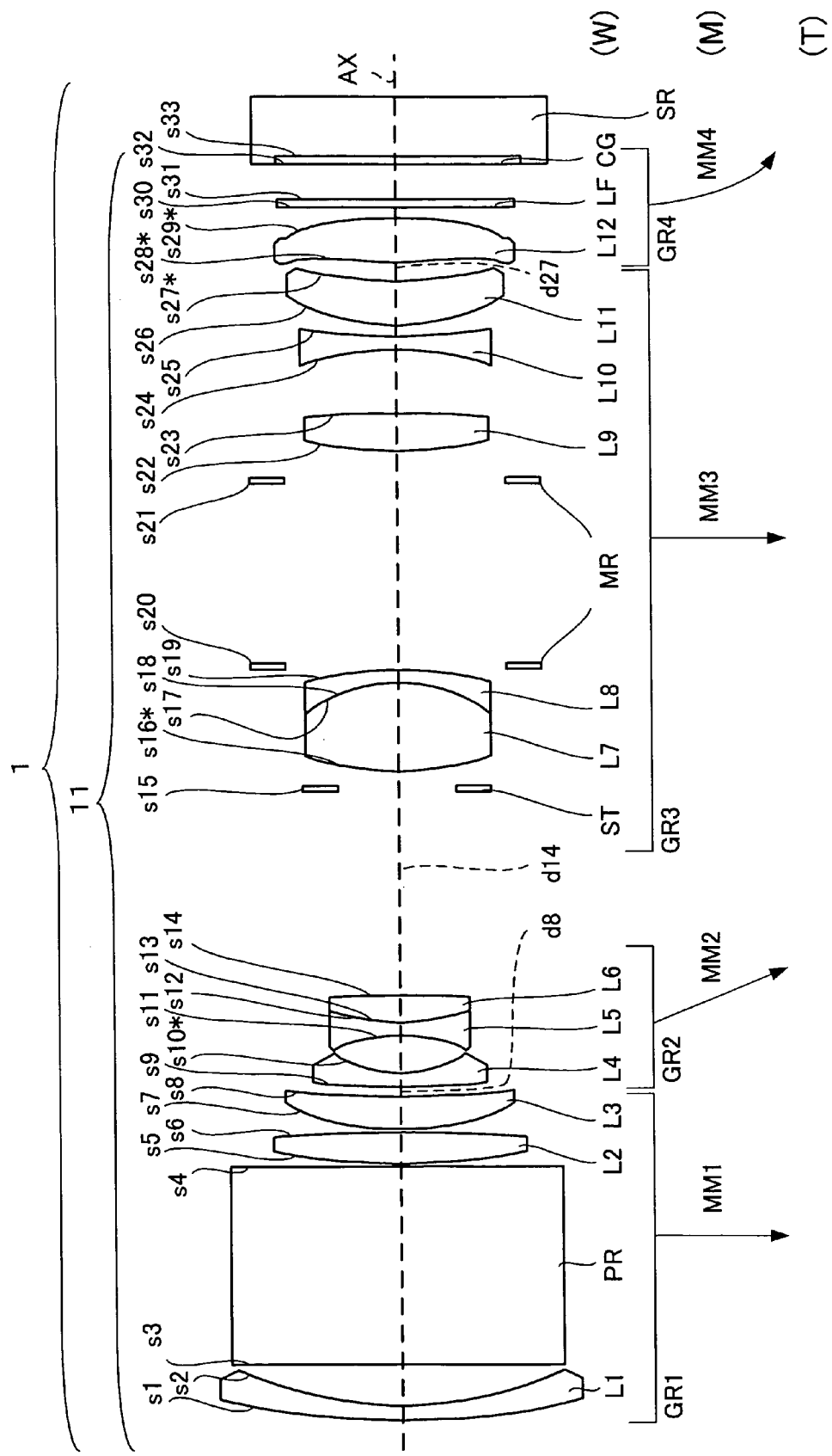
FIG. 1 is a diagram showing the lens construction of a variable-magnification optical system (Example 1) used in a lens unit according to the present invention.

On the other hand, FIG. 1 is a diagram showing the lens construction of the lens unit 1 shown in FIGS. 2 and 3, and shows it, for the sake of convenience, with the optical axis straightened throughout. As shown in FIG. 1, the lens unit 1 includes the variable-magnification optical system 11 and the image-sensing device SR.

In FIG. 1, GRi represents a lens group, Li represents a lens element, and si represents a surface (such as transmissive surface). The numerical suffix "i" with which each symbol GRi, Li, or si ends indicates the place as counted from object side to image side at which the element it refers to is located among all the elements of the same kind. An aspherical surface is marked with an asterisk "*". The variable-magnification optical system 11 (lens unit 1) shown in FIG. 1 is referred to as Example 1.

2-1. Lens Unit Construction

The lens unit 1 of the variable-magnification optical system 11 includes, from the shooting target side (object side), a first lens group GR1, a second lens group GR2, a third lens group GR3, and a fourth lens group GR4.

2-1-1. First Lens Group

The first lens group (the most object-side lens group, the first lens group as counted from the object side) GR1 includes a first lens element L1, an optical prism PR, a second lens element L2, and a third lens element L3. The first lens group GR1 as a whole has a "positive" optical power (refractive power). It should be understood that an optical power is defined as the reciprocal of a focal length.

The first lens element L1 (the front lens element) is a negative meniscus lens element convex to the object side.

The optical prism (an optical axis changing member) PR is a prism (for example, a rectangular prism) that bends at right angles the light beam incoming from the object side. The optical prism PR receives the light beam through an entrance surface s3 thereof, and lets the light beam exit therefrom through an exit surface s4 thereof.

The second lens element L2 is a positive lens element having convex surfaces on both sides (a biconvex lens element). The third lens element L3 is a positive meniscus lens element convex to the object side.

2-1-2. Second Lens Group

The second lens group (an intermediate lens group, the second lens group as counted from the object side) GR2 includes a fourth lens element L4, a fifth lens element L5, and a sixth lens element L6. The second lens group GR2 as a whole has a "negative" optical power.

The fourth lens element L4 is a negative meniscus negative lens element convex to the object side. The fourth lens element L4 has an aspherical surface s10 (a refractive optical surface having an aspherical shape, a surface exerting a refractive effect equivalent to that exerted by an aspherical surface, or the like).

The fifth lens element L5 is a negative lens element having concave surfaces on both sides (a biconcave lens element). The sixth lens element L6 is a positive lens element having convex surfaces on both sides. The fifth and sixth lens elements L5 and L6 are cemented together at the surfaces s13 and s14 thereof to form a cemented lens element. The cementing together of the lens elements is achieved, for example, by the use of adhesive (likewise, any cemented lens element mentioned later is formed by cementing together the constituent lens elements thereof, for example, with adhesive).

2-1-3. Third Lens Group

The third lens group (an intermediate lens group, the third lens group as counted from the object side) GR3 includes an optical aperture stop ST, a seventh lens element L7, an eighth lens element L8, a reflective mirror MR, a ninth lens element L9, a tenth lens element L10, and an eleventh lens element L11. The third lens group GR3 as a whole has a "positive" optical power.

The optical aperture stop ST is an aperture stop that permits the aperture diameter to be varied. The optical aperture stop ST is built integrally with the third lens group GR3. For the sake of convenience, in FIG. 1, the optical aperture stop ST itself is indicated as s15.

At the position of the optical aperture stop ST, a shutter may be provided. This construction eliminates the need for a drive power source and a drive mechanism for moving the optical aperture stop ST and the shutter, and thus helps make the lens unit 1 compact (the shutter may instead be provided at the position of the optical aperture stop ST described later).

The seventh lens element L7 is a positive lens element having convex surfaces on both sides. The seventh lens element L7 has an aspherical surface s16.

The eighth lens element L8 is a negative meniscus lens element concave to the object side. The seventh and eighth lens elements L7 and L8 are cemented together at the surfaces s17 and s18 thereof to form a cemented lens element.

The reflective mirror (an optical axis changing member) MR reflects the light beam exiting from the eighth lens element L8 to direct the light beam to the ninth lens element L9. The reflective mirror MR is located between the eighth and ninth lens groups L8 and L9.

The ninth lens element L9 is a positive lens element having convex surfaces on both sides. The tenth lens element L10 is a negative lens element having concave surfaces on both sides. The eleventh lens element L11 is a positive meniscus lens element convex to the object side. The eleventh lens element L11 has an aspherical surface s27.

2-1-4. Fourth Lens Group

The fourth lens group (the most image-side lens group, the fourth lens group as counted from the object side) GR4 includes a twelfth lens element L12, a low-pass filter LF, and a cover glass CG. The fourth lens group GR4 as a whole has a "positive" optical power.

The twelfth lens element L12 is a positive lens element having convex surfaces on both sides. The twelfth lens element L12 has aspherical surfaces s28 and s29.

The low-pass filter LF is a filter having two surfaces (s30 and s31), and is designed as an optical filter (for example, an infrared cut filter) having predetermined cut-off frequency characteristics determined according to the pixel pitch of the image-sensing device SR.

The cover glass CG is a glass plate having two surfaces (s32 and s33), and serves to protect the light-receiving surface of the image-sensing device SR. Accordingly, the surface s33 of the cover glass CG and the light-receiving surface of the image-sensing device SR are located very close together (for example, with a gap of about 0.5 mm left between the surface s33 and the light-receiving surface).

2-1-5. Image-Sensing Device

In the lens unit 1 according to the present invention, the image-sensing device SR is movable. The image-sensing device SR is moved, for example, by an image-sensing device driving section (not illustrated) including a driving motor (image-sensing device driving motor) and a transmission mechanism (image-sensing device transmission mechanism) for transmitting the driving force of the motor to the image-sensing device SR.

The image-sensing device SR may be moved with drive power from any drive power source other than such an image-sensing device driving section. For example, the image-sensing device SR and the fourth lens group GR4 may be coordinated (coupled) together so that they are simultaneously (integrally) moved with the drive power from the optical system driving section 13.

This construction eliminates the need for, for example, a drive power source dedicated to the movement of the image-sensing device SR and one dedicated to the movement of the fourth lens group GR4. Moreover, integrating the image-sensing device SR and the fourth lens group GR4 together in close contact results in making the gap between them comparatively narrow, and thus helps make the lens unit 1 compact.

This is the reason that Embodiment 1, and also Embodiments 2 and 3 described later, deals with, as an example, a lens unit 1 in which the image-sensing device SR and the fourth lens group GR4 move together.

The image-sensing device SR and the fourth lens group GR4 can be coupled (integrated) together by bonding together with adhesive or otherwise putting together the housing of the image-sensing device SR and the fourth lens group GR4. Alternatively, the image-sensing device SR and the fourth lens group GR4 may be so designed that, although they are disposed independently of each other, they can be moved integrally (simultaneously).

2-2. Construction Data of the Variable-Magnification Optical System (Example 1)

Tables 1 and 2 show the construction data of the variable-magnification optical system 11 of Example 1 included in the lens unit 1 described above.

In Table 1, a symbol in the form of ri represents the radius of curvature (in mm) of a surface (si). An aspherical surface is marked with an asterisk (*). A symbol in the form of di represents the axial distance (in mm) between the i-th surface (si) and the (i+1)-th surface (si+1). For any axial distance that varies with zooming, three values are given that are, from left, the value of di at the wide-angle end position (W), that at the middle focal length position (M), and that at the telephoto end position (T).

Symbols in the forms of Ni and vi represent the refractive index (Nd) and the Abbe number (vi), respectively, of the medium filling a given axial distance (di). Here, the refractive index (Nd) and the Abbe number (vi) are those for the d-line (having a wavelength of 587.56 nm).

Shown together in Table 1 are the focal length f (in mm) and f-number FNO of the entire system as observed at each of the following different "focal length positions": the wide-angle end position (W, the shortest-focal-length position); the middle focal length position (M); and the telephoto end position (T, the longest-focal-length position).

Here, an aspherical surface is defined by formula (1) below.

$$X(H) = C_0 \cdot H^2 / (1 + \sqrt{1 - \epsilon \cdot C_0^2 \cdot H^2}) + \Sigma A_j \cdot H^j \quad (1)$$

where

H represents the height in a direction perpendicular to the optical axis AX;

X(H) represents the displacement along the optical axis (the sag) at the height h;

$C_0$ represents the paraxial curvature (=1/ri);

$\epsilon$ represents the quadric surface parameter;

j represents the order of the aspherical surface; and

Aj represents the aspherical coefficient of order j.

Table 2 shows the data related to the aspherical surfaces. The coefficient of any term that does not appear in the table equals to 0 (zero). For all the data shown, "E-n" represent "×10$^{-n}$".

2-3. Movement of the Individual Lens Groups in the Lens Unit 2-3-1. Zooming

Now, the movement of the individual lens groups (GR1 to GR4) will be described with reference to FIG. 1. In the lens unit 1, magnification variation (zooming or the like) is achieved by varying the distances between the individual lens groups along the optical axis AX. For example, in the lens unit 1 shown in FIG. 1, zooming is achieved by moving part (the second lens group GR2 etc.) of the lens groups.

For the sake of convenience, in FIG. 1, only the axial distances (di) that vary as zooming is performed are indicated by their respective symbols; specifically, only the axial distances d8, d14, and d27 are shown.

The lens construction diagram of FIG. 1 shows the lens arrangement at the wide-angle end position (W) as observed on an optical section. In this diagram, arrows MMi schematically indicate the movement of the individual lens groups from the wide-angle end position (W) to the middle focal length position (M) and further to the telephoto end position (T). The numerical suffix "i" with which each symbol MMi ends indicates the place as counted from object side to image side at which the arrow it refers to is located, the number thus coinciding with that of the lens unit the arrow is relevant to.

In the lens unit 1 shown in FIG. 1, as zooming is performed from the wide-angle end position (W) to the telephoto end position (T), the distance between the first and second lens groups GR1 and GR2 increases, the distance between the second and third lens groups GR2 and GR3 decreases, and the distance between the third and fourth lens groups GR3 and GR4 (here, the fourth lens group GR4 is built integrally with the image-sensing device SR, and is thus referred to also as GR4+SR in the following description) increases.

Specifically, in the lens unit 1, during zooming, the second lens group GR2 is moved toward the image side, and the fourth lens group GR4 (GR4+SR) is moved toward the image side; on the other hand, meanwhile, the first lens group GR1 and the third lens group GR3 are kept stationary (kept in fixed positions).

Table 3 shows the amounts by which the individual lens groups (GR1 to GR4 (GR4+SR)) are moved during zooming.

In Table 3, the wide-angle end position (W) is used as the reference position, and accordingly the amounts of movement (in mm) at the wide-angle end position (W) all equal "0.0000". With respect to this reference position (wide-angle end position (W)), movement pointing from object side to image side is indicated with the "+" sign, and movement pointing from image side to object side is indicated with the "−" sign. Moreover, in Table 3, the symbol TL indicates the distance (in mm) from the vertex of the surface rl of the first lens element L1 to the light-receiving surface of the image-sensing device SR.

As will be understood from Table 3 and FIG. 1, in the lens unit 1 incorporating the variable-magnification optical system 11 of Example 1, the second lens group GR2 and the fourth lens group GR4 (GR4+SR) are movable. Here, the second lens group GR2 functions as a variator for varying the focal length, and the fourth lens group GR4 (GR4+SR) functions as a compensator for compensating for the movement of the image point resulting from zooming.

FIGS. 4A to 4C, 5A to 5C, and 6A to 6C show the aberrations observed in the variable-magnification optical system 11 at different zoom positions. Specifically, FIGS. 4A to 4C show the aberrations observed at the wide-angle end position (W), FIGS. 5A to 5C show the aberrations observed at the middle focal length position (M), and FIGS. 6A to 6C show the aberrations observed at the telephoto end position (T).

FIGS. 4A, 5A, and 6A show spherical aberration (S.A.) and side condition (S.C.). In these diagrams, a solid line d represents the spherical aberration (in mm) for the d-line, and a broken line SC represents the deviation (in mm) from the ideal sine condition. Shown together in these diagrams are the FNOs (f-numbers) at the respective focal length positions.

FIGS. 4B, 5B, and 6B show astigmatism. In these diagrams, a broken line DM represents the astigmatism (in mm) for the d-line as observed on the meridional surface, and a solid line DS represents the astigmatism (in mm) for the d-line as observed on the sagittal surface. Shown together in these diagrams are the values of Y' (in mm), which represents the maximum image height (the distance from the optical axis AX) on the light-receiving surface of the image-sensing device SR.

FIGS. 4C, 5C, and 6C show distortion. In these diagrams, a solid line represents the distortion (%) for the d-line. Shown together in these diagrams are the values of Y'.

2-3-2. Focusing

Next, focusing in the lens unit 1 will be described with reference to Table 4. Table 4 shows the amounts by which the individual lens groups are moved when, after zooming has been performed as described above, the shooting target (subject) is shot with the lens unit 1 (in a case where the subject is located at the closest shootable distance).

In Table 4, the positions of the lens groups at the different focal length positions (W, M, and T) shown in FIG. 3 are used as the reference positions for the respective focal length positions. Moreover, in Table 4, the closest shootable distance (in mm) is the distance from the surface of the subject (subject surface) to the vertex of the surface r1 in the first lens element L1.

As shown in Table 4, in the lens unit 1 shown in FIG. 1, during focusing at any of the focal length positions, while the fourth lens group GR4 (GR4+SR) is moved toward the image side, the first to third lens groups GR1 to GR3 are kept stationary.

FIGS. 7A to 7C, 8A to 8C, and 9A to 9C show the aberrations observed in the variable-magnification optical system 11 when focusing is achieved. Specifically, FIGS. 7A to 7C show the aberrations observed at the wide-angle end position (W) when the focus is at the closest shootable distance, namely 0.2 m, FIGS. 8A to 8C show the aberrations observed at the middle focal length position (M) when the focus is at the closest shootable distance, namely 0.9 m, and FIGS. 9A to 9C show the aberrations observed at the telephoto end position (T) when the focus is at the closest shootable distance, namely 0.9 m. FIGS. 7A, 8A, and 9A show spherical aberration, FIGS. 7B, 8B, and 9B show astigmatism, and FIGS. 7C, 8C, and 9C show distortion. Accordingly, as to what different types of line represent in these diagrams, the same definitions apply as given above in connection with FIGS. 4A to 4C, 5A to 5C, and 6A to 6C.

3. Examples of Various Features of the Present Invention

As described above, the lens unit 1 according to the present invention (the lens unit 1 incorporating the variable-magnification optical system 11 of Example 1) includes a variable-magnification optical system 11 that includes a plurality of lens groups including the first to fourth lens groups GR1 to GR4 and an image-sensing device SR that receives the light from the shooting target through the variable-magnification optical system 11.

Of those lens groups (GR1 to GR4), the most object-side one, i.e., the first lens group GR1, includes an optical prism PR for changing the optical axis. In the lens unit 1 constructed as described above according to the present invention, during zooming, while the first lens group GR1 is kept stationary, the image-sensing device SR is moved along the optical axis AX.

In general, in a construction where, while an image-sensing device SR is kept stationary (kept in a fixed position), a lens group (for example, the first lens group GR1) disposed closer to the shooting target (to the object side) than is the image-sensing device SR is movable, the longer the distance between the image-sensing device SR and the first lens group GR1 (that is, the longer the total length of the lens unit 1), the greater the lens diameters of the lens elements constituting the first lens group GR1 (for example, the diameter of the first lens element L1, i.e., the front lens diameter) tend to be. This is because the first lens element L1 is then disposed closer to the shooting target, and thus needs to receive light at comparatively wide angles. Accordingly, this tendency is particularly notable when shooting is performed at wide angles (at the wide-angle end position).

By contrast, in the lens unit according to the present invention, during zooming, the image-sensing device SR is moved (is movable); on the other hand, even during zooming, the first lens group GR1 is kept stationary.

Zooming performed as described above by moving an image-sensing device SR while keeping a first lens group GR1 stationary requires a construction similar to one required by zooming performed by keeping the image-sensing device SR stationary while moving a first lens group GR1. This is because, in relative terms, keeping an image-sensing device SR stationary while moving a first lens group GR1 is equivalent to moving an image-sensing device SR while keeping a first lens group GR1 stationary.

Thus, in the lens unit 1 according to present invention, zooming (in particular, shooting at wide angles) can be performed by moving the image-sensing device SR. This eliminates the need for, for example, the first lens group GR1 to be moved out toward the shooting target (to the object side). Thus, the diameters (for example, the front lens diameter) of the first and other lens elements L1 etc. constituting the first lens group GR1 can be made comparatively small (compact).

Moreover, the first lens group GR1, which is kept stationary, includes an optical prism PR, and this optical prism PR no longer needs to receive light at comparatively wide angles. Thus, the optical prism PR can be made comparatively compact.

Moreover, in the lens unit 1 according to the present invention, of the second and third lens groups GR2 and GR3 disposed between the first and fourth lens groups GR1 and GR4, at least one (for example, the third lens group GR3) includes a reflective mirror MR for changing the optical axis.

Constructed as described above, the lens unit 1 according to the present invention can also be said to be so configured that, during zooming, while the third lens group GR3 including the reflective mirror MR is kept stationary, the image-sensing device SR is moved along the optical axis AX.

As described above, in the lens unit 1 according to the present invention, zooming is achieved by moving the image-sensing device SR. This eliminates the need for the third lens group GR3 to be moved out toward the shooting target. As a result, the third lens group GR3 no longer needs to receive light at comparatively wide angles, and thus the diameters of the seventh and other lens elements L7 etc. constituting the third lens group GR3 can be made comparatively small.

Moreover, in the lens unit 1 according to the present invention, the third lens group GR3 includes the reflective mirror MR, and this reflective mirror MR no longer needs to receive light at comparatively wide angles. Thus, the reflective mirror MR can be made comparatively compact.

As compared with the light that enters the first lens group GR1, the light that enters the third lens group GR3, which is located farther from the object side, often has a smaller image height (a smaller beam diameter). Thus, the reflective mirror MR provided in the third lens group GR3, which is kept stationary, only has to receive light having a small image height. This helps make the reflective mirror MR still more compact.

The lens unit 1 according to the present invention can also be said to have both of the two features described above. Specifically, in the lens unit 1 according to the present invention, while the first lens group GR1 includes an optical prism PR, the third lens group GR3 includes a reflective mirror MR; moreover, during zooming, while the first and third lens groups GR1 and GR3 are kept stationary, the image-sensing device SR is moved along the image-sensing device SR.

With the lens unit 1 constructed as described above, the lens diameters of the first and other lens elements L1 etc. included in the first lens group GR1 can be reduced, the lens diameters of the seventh and other lens elements L7 etc. included in the third lens group GR3 can be reduced, and the sizes of the optical axis changing members (the optical prism PR and the reflective mirror MR) provided in those lens groups (the first and third lens groups GR1 and GR3) can be reduced.

Moreover, as shown in FIGS. 2 and 3, by the use of the optical prism PR and the reflective mirror MR, the lens unit 1 can change (bend) the optical axis. In addition, the optical prism PR and the reflective mirror MR are compact. Moreover, the diameters of the lens elements constituting the variable-magnification optical system 11 are comparatively small. Thus, with the lens unit 1 according to the present invention, it is possible to arrange compact lens groups comparatively freely within a limited space, and as a result it is possible to realize a very compact image-sensing apparatus 29.

In general, as zooming is performed in the lens unit 1, various aberrations, as those mentioned earlier, appear. In the lens unit 1 according to the present invention, those aberrations can be corrected by moving the image-sensing device SR alone. With the movement of the image-sensing device SR alone, however, it is difficult to achieve satisfactory correction.

To overcome this inconvenience, in the lens unit 1 according to the present invention, during zooming, together with the image-sensing device SR, the fourth lens group GR4 is moved. That is, in the lens unit 1 according to the present invention, aberrations are corrected with the movement of two movable components (the fourth lens group GR4 etc. and the image-sensing device SR). This, as compared with aberration correction with the movement of the image-sensing device SR alone, permits satisfactory aberration correction.

From the viewpoint of satisfactory aberration correction, the fourth lens group GR4 may include a lens element having aspherical surfaces (s28 and s29). With this construction, the lens unit 1 can effectively correct aberrations.

Moreover, in the lens unit 1 according to the present invention, the fourth lens group GR4 is moved. Thus, the aberrations produced by the lens groups other than the fourth lens group GR4, namely the first to third lens groups GR1 to GR3, can be corrected effectively with the fourth lens group GR4, which is movable. This increases, in the lens unit 1 according to the present invention, flexibility in the design of the first to third lens groups GR1 to GR3 (for example, in the design of their curvatures and the like).

Thus, according to the present invention, the lens unit 1 not only permits the lens diameters (such as the front lens diameter) to be made comparatively small and the optical axis changing members (reflecting members) to be made comparatively compact but also permits satisfactory aberration correction.

Moreover, in the lens unit 1 according to the present invention, the fourth lens group GR4 and the image-sensing device SR are integrated together. During focusing, of all the lens groups GR1 to GR4, while at least one of the lens groups other than the fourth lens group GR4, i.e., at least one of the lens groups GR1 to GR3, is kept stationary (in Example 1, all of the first to third lens groups GR1 to GR3), the fourth lens group GR4 and the image-sensing device SR are moved simultaneously (integrally) along the optical axis AX.

In general, in a variable-magnification optical system 11, when focusing is performed on completion of zooming, one of a plurality of lens groups (GR1 to GR4) is moved. This tends to cause various aberrations. In particular, when shooting is performed at a close-up distance (for example, at the closest shootable distance), focusing requires the lens unit to be moved by a comparatively large amount. This tends to cause particularly notable aberrations.

In the lens unit 1 according to the present invention, during focusing, while the image-sensing device SR is moved, of the lens groups GR1 to GR3 other than the fourth lens group GR4, at least one (for example, the first lens group GR1) is kept stationary.

Focusing performed as described above by moving an image-sensing device SR while keeping a first lens group GR1 stationary requires a construction similar to one required by focusing performed by keeping an image-sensing device SR stationary while moving a first lens group GR1. Thus, in the lens unit 1 according to the present invention, aberrations can be corrected for to a degree comparable with the degree achieved with focusing involving a stationary image-sensing device.

In addition, in the lens unit 1 according to the present invention, to permit the image-sensing device SR and the fourth lens group GR4 to be moved integrally, those two components (the image-sensing device SR and the fourth lens group GR4) may be built integrally. As described above, such an integrated structure helps make the lens unit 1 compact. Moreover, the aberrations produced by the lens groups Gr1 to Gr3 other than the fourth lens group GR4 are effectively corrected by the fourth lens group GR4, which is movable. This increases, in the lens unit 1 according to the present invention, flexibility in the deign of the first to third lens groups GR1 to GR3.

Moreover, as describe above, the aberrations resulting from the movement of the lens groups are reduced. This makes easy the designing of the fourth lens group GR4 in terms of aberration correction, and thus increases flexibility in the design of the fourth lens group GR4.

Moreover, in the lens unit 1 according to the present invention, the plurality of lens groups GR1 to GR4 include at least, from the object side, a first lens group GR1 having a positive optical power, a second lens group GR2 having a negative optical power, a third lens group GR3 having a positive optical power, and a fourth lens group GR4 having a positive optical power.

In the lens unit 1 constructed as described above, during zooming from the wide-angle end position (W) to the telephoto end position (T), the distance between the first and second lens groups GR1 and GR2 is increased, the distance between the second and third lens groups GR2 and GR3 is decreased, and the distance between the third and fourth lens groups GR3 and GR4 is increased.

In the lens unit 1 constructed as described above, the first lens group GR1 has a positive optical power, and the next, second lens group GR2 has a negative optical power. Thus, the light from the shooting target is first made to converge by the first lens group GR1, and the resulting convergent light beam is then made to diverge by the second lens group GR2.

In this case, the distance between the first and second lens groups GR1 and GR2 is increased. Thus, the focal length of the first lens group GR1 is shorter than the focal length of the variable-magnification optical system 11 (the focal length of the entire system). Moreover, the second lens group GR2 alleviates the convergence of the light beam immediately before the light having passed through the first lens group GR1 is focused. This brings the imaging point backward, and thus makes the focal length long relative to the previously determined total length of the lens unit 1. Consequently, the lens unit 1 according to the present invention has a comparatively high magnification (a comparatively high magnification-variation ratio).

In addition, in the lens unit 1 according to the present invention, the distance between the first and second lens groups GR1 and GR2 is increased, the distance between the second and third lens groups GR2 and GR3 is decreased, and the distance between the third and fourth lens groups GR3 and GR4 is increased. To achieve zooming by varying the distances in that way, for example, the second and fourth lens groups GR2 and GR4 are moved, or alternatively the first to fourth lens units GR1 to GR4 are moved.

Thus, zooming can be achieved by moving the lens groups GR1 to GR4 in one of many possible ways. A comparatively small number of lens groups (for example, GR2 and GR4) may be involved in zooming (magnification variation), or a comparatively large number of lens groups (for example, GR1, GR2, and GR4) may be involved in zooming. Thus, according to the present invention, the lens unit 1 permits increased flexibility in the movement of the lens groups.

Embodiment 2

Another embodiment (Embodiment 2) of the present invention will be described below. Such components as function in substantially the same manners as in Embodiment 1 will be identified with common reference symbols, and their explanations will not be repeated.

In the lens unit 1 of Embodiment 1, of the plurality of lens groups GR1 to GR4, the first and third lens groups GR1 and GR3 are kept stationary. Moreover, these first and third lens groups GR1 and GR3 include an optical prism PR and a reflective mirror MR, respectively.

According to the present invention, however, the number of lens groups that are kept stationary does not necessarily have to be two, nor does the number of optical axis changing members provided. That is, at least one lens group has to be kept stationary. Now, a lens unit 1 incorporating a variable-magnification optical system 11 in which only the first lens group GR1 is kept stationary will be described.

1. Lens Unit

A lens unit 1 in which, during zooming, the second, third, and fourth lens groups GR2, GR3, and GR4 (GR4+SR) are moved will be described below with reference to FIG. 10. The variable-magnification optical system 11 incorporated in this lens unit 1 of Embodiment 2 is referred to as Example 2. This variable-magnification optical system 11 of Example 2 is aligned along a straight line.

1-1. Lens Unit Construction

The variable-magnification optical system 11 (Example 2) of the lens unit 1, like that of Example 1, includes, from the shooting target side (object side), a first lens group GR1, a second lens group GR2, a third lens group GR3, and a fourth lens group GR4.

1-1-1. First Lens Group

The first lens group (the most object-side lens group, the first lens group as counted from the object side) GR1 includes a first lens element L1, an optical prism PR, and a second lens element L2. The first lens group GR1 as a whole has a "positive" optical power (refractive power).

The first lens element L1 (the front lens element) is a negative meniscus lens element convex to the object side.

The optical prism PR is a prism (for example, a rectangular prism) that bends at right angles the light beam incoming from the object side. The optical prism PR receives the light beam through an entrance surface s3 thereof, and lets the light beam exit therefrom through an exit surface s4 thereof.

The second lens element L2 is a positive lens element having convex surfaces on both sides (a biconvex lens element).

1-1-2. Second Lens Group

The second lens group (an intermediate lens group, the second lens group as counted from the object side) GR2 includes a third lens element L3 and a fourth lens element L4. The second lens group GR2 as a whole has a "negative" optical power.

The third lens element L3 is a negative lens element having concave surfaces on both sides. The third lens element L3 has aspherical surfaces s7 and s8. The fourth lens element L4 is a positive meniscus lens element convex to the object side.

1-1-3. Third Lens Group

The third lens group (an intermediate lens group, the third lens group as counted from the object side) GR3 includes an optical aperture stop ST, a fifth lens element L5, a sixth lens element L6, a seventh lens element L7, and an eighth lens element L8. The third lens group GR3 as a whole has a "positive" optical power.

The optical aperture stop ST, like the one described earlier, is an aperture stop that permits the aperture diameter to be varied. The optical aperture stop ST is built integrally with the third lens group GR3. For the sake of convenience, in FIG. 10, the optical aperture stop ST itself is indicated as s11.

The fifth lens element L5 is a negative meniscus lens element convex to the object side. The sixth lens element L6 is a positive lens element having convex surfaces on both sides. The seventh lens element L7 is a positive meniscus lens element convex to the object side.

The eighth lens element L8 is a negative meniscus lens element convex to the object side. The eighth lens element L8 has an aspherical surface s19. The seventh and eighth lens elements L7 and L8 are cemented together at the surfaces s17 and s18 thereof to form a cemented lens element.

1-1-4. Fourth Lens Group

The fourth lens group (the most image-side lens group, the fourth lens group as counted from the object side) GR4 includes a ninth lens element L9, a plane-parallel plate PT, and a cover glass CG. The fourth lens group GR4 as a whole has a "positive" optical power.

The ninth lens element L9 is a positive meniscus lens element convex to the object side. The ninth lens element L9 has aspherical surfaces s20 and s21.

The plane-parallel plate PT has two surfaces s22 and s23. This plane-parallel plate PT functions as a low-pass filter.

The cover glass CG is a glass plate having two surfaces (s24 and s25), and serves to protect the light-receiving surface of the image-sensing device SR. Accordingly, the surface s25 of the cover glass CG and the light-receiving surface of the image-sensing device SR are located very close together.

1-2. Construction Data of the Variable-Magnification Optical System (Example 2)

Tables 5 and 6 show the construction data of the variable-magnification optical system 11 of Example 2 described above. In Tables 5 and 6, the same conventions apply as in Tables 1 and 2 described earlier.

1-3. Movement of the Individual Lens Groups in the Lens Unit 1-3-1. Zooming

Now, the movement of the individual lens groups (GR1 to GR4) will be described with reference to FIG. 10. For the sake of convenience, in FIG. 10, only the axial distances (di) that vary as zooming is performed are indicated by their respective symbols; specifically, only the axial distances d6, d10, and d19 are shown.

Figure 10:
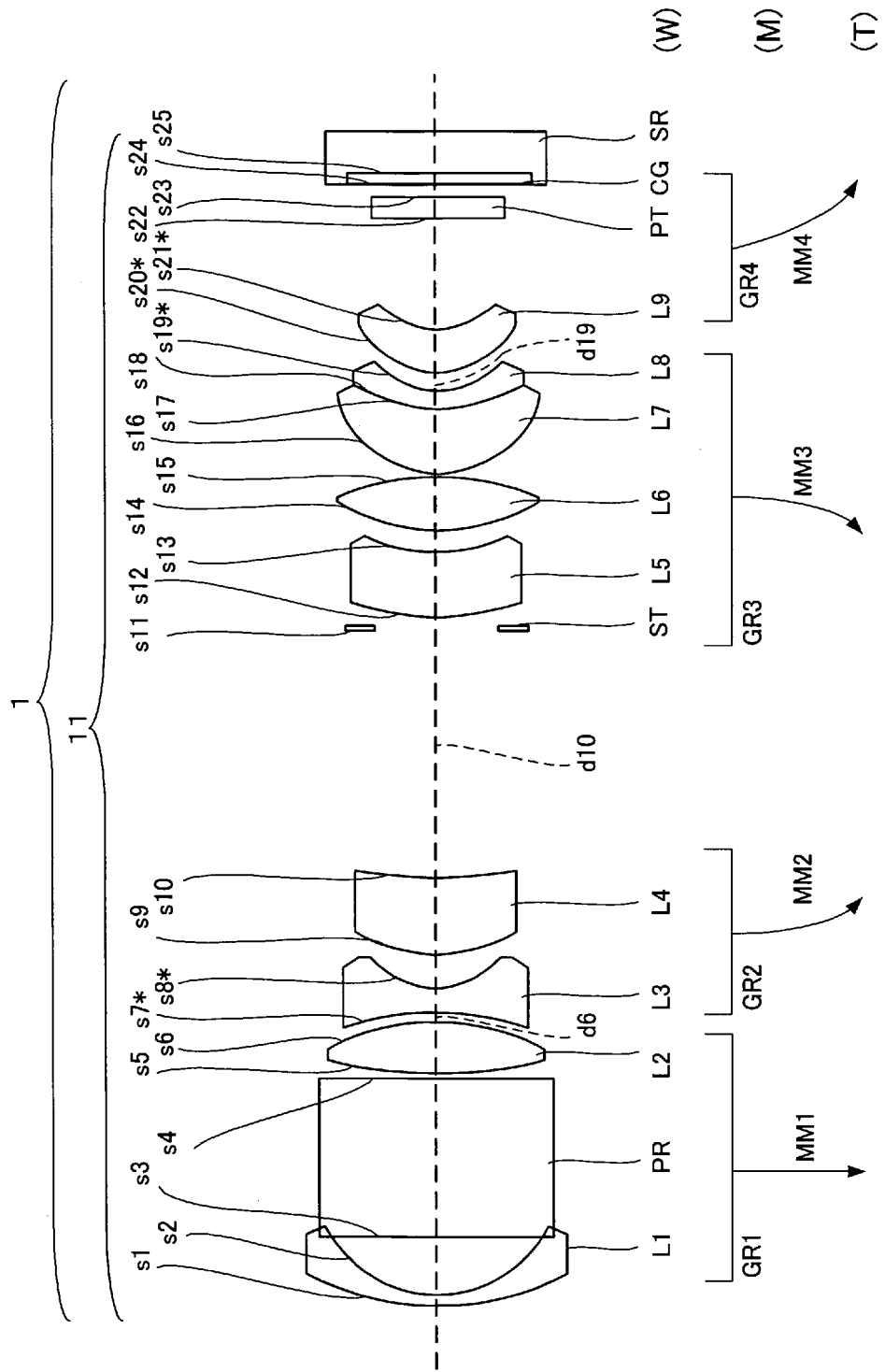
FIG. 10 is a diagram showing the lens construction of a variable-magnification optical system (Example 2) used in a lens unit according to the present invention.
Figure 11A:
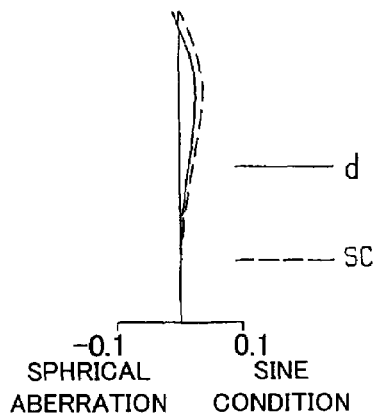
FIG. 11A is a diagram showing the spherical aberration observed in the variable-magnification optical system (Example 2) at the wide-angle end position (W)
Figure 11B:
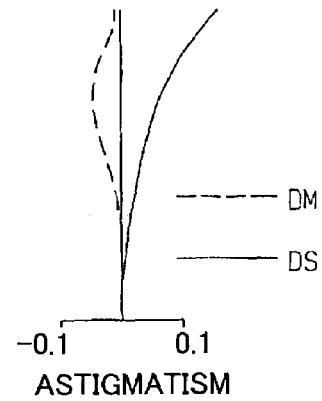
FIG. 11B is a diagram showing the astigmatism observed in the variable-magnification optical system (Example 2) at the wide-angle end position (W)
Figure 11C:
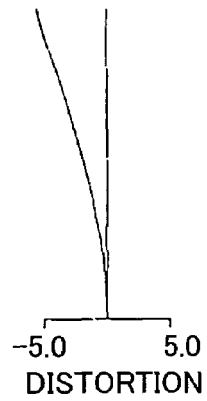
FIG. 11C is a diagram showing the distortion observed in the variable-magnification optical system (Example 2) at the wide-angle end position (W)
Figure 12A:
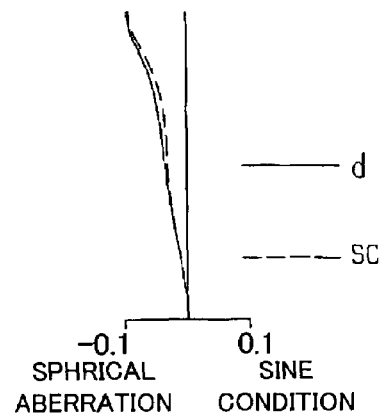
FIG. 12A is a diagram showing the spherical aberration observed in the variable-magnification optical system (Example 2) at the middle focal length position (M)
Figure 12B:
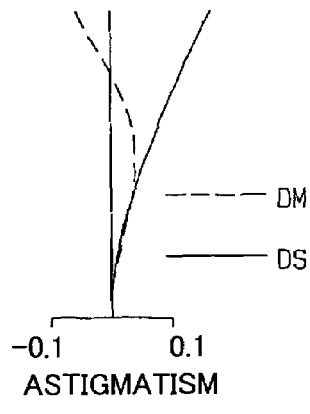
FIG. 12B is a diagram showing the astigmatism observed in the variable-magnification optical system (Example 2) at the middle focal length position (M)
Figure 12C:
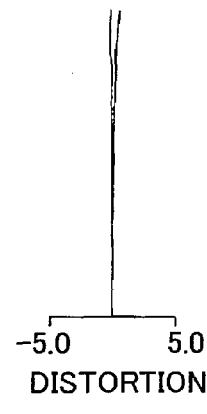
FIG. 12C is a diagram showing the distortion observed in the variable-magnification optical system (Example 2) at the middle focal length position (M)
Figure 13A:
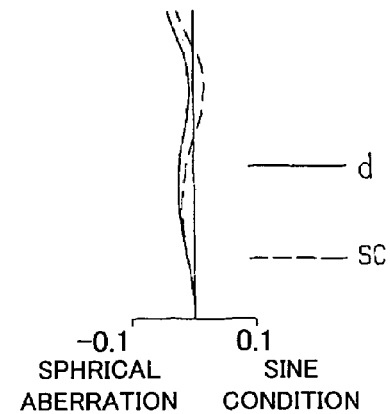
FIG. 13A is a diagram showing the spherical aberration observed in the variable-magnification optical system (Example 2) at the telephoto end position (T)
Figure 13B:
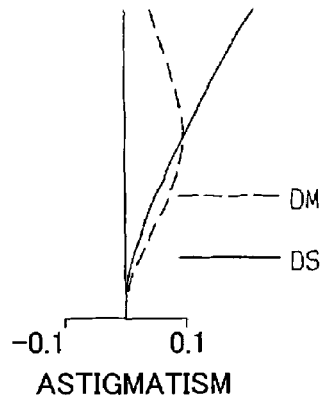
FIG. 13B is a diagram showing the astigmatism observed in the variable-magnification optical system (Example 2) at the telephoto end position (T)
Figure 13C:
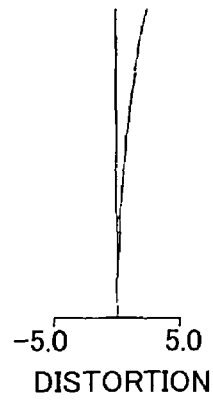
FIG. 13C is a diagram showing the distortion observed in the variable-magnification optical system (Example 2) at the telephoto end position (T)

In the lens unit 1 shown in FIG. 10, as zooming is performed from the wide-angle end position (W) to the telephoto end position (T), the distance between the first and second lens groups GR1 and GR2 increases, the distance between the second and third lens groups GR2 and GR3 decreases, and the distance between the third and fourth lens groups GR3 and GR4 (GR4+SR) increases.

Specifically, in the lens unit 1, during zooming, the second and fourth lens groups GR2 and GR4 are moved toward the image side, and the third lens group GR3 is moved toward the object side; on the other hand, meanwhile, the first lens group GR1 is kept stationary (kept in fixed positions).

Table 7 shows the amounts by which the individual lens groups (GR1 to GR4 (GR4+SR)) are moved during zooming. In Table 7, the same conventions apply as in Table 3 described earlier.

As will be understood from Table 7 and FIG. 10, in the lens unit 1 incorporating the variable-magnification optical system 11 of Example 2, the second, third, and fourth lens groups GR2, GR3, and GR4 (GR4+SR) are movable.

FIGS. 11A to 11C, 12A to 12C, and 13A to 13C show the aberrations observed in the variable-magnification optical system 11 at different zoom positions. In these diagrams, the same conventions apply as in FIGS. 4A to 4C, 5A to 5C, and 6A to 6C.

1-3-2. Focusing

Next, focusing in the lens unit 1 will be described with reference to Table 8. In Table 8, the same conventions apply as in Table 4 described above.

As shown in Table 8, in the lens unit 1 shown in FIG. 10, during focusing at any of the focal length positions, while the fourth lens group GR4 (GR4+SR) is moved toward the image side, the first to third lens groups GR1 to GR3 are kept stationary.

FIGS. 14A to 14C, 15A to 15C, and 16A to 16C show the aberrations observed in the variable-magnification optical system 11 when focusing is achieved. In these diagrams, the same conventions apply as in FIGS. 7A to 7C, 8A to 8C, and 9A to 9C.

2. Examples of Various Features of the Present Invention

As described above, the lens unit 1 of Embodiment 2, like that of Embodiment 1, includes a variable-magnification optical system 11 that includes a first to a fourth lens group GR1 to GR4 (a plurality of lens groups) and an image-sensing device SR that receives the light from the shooting target through the variable-magnification optical system 11.

Of those lens groups (GR1 to GR4), the most object-side one, i.e., the first lens group GR1, includes an optical prism PR for changing the optical axis. In the lens unit 1 constructed as described above according to the present invention, during zooming, while the first lens group GR1 is kept stationary, the image-sensing device SR is moved along the optical axis AX.

Thus, the lens unit 1 of Embodiment 2 (see FIG. 10) is constructed similarly to the lens unit 1 of Embodiment 1 in that the first lens group GR1 is kept stationary, in that the fourth lens group GR4 and the image-sensing device SR are moved, in that the same optical power arrangement is adopted, and in other respects.

Consequently, the lens unit 1 of Embodiment 2 offers at least the advantages stated below among those stated earlier in connection with Embodiment 1:

(i) During zooming, the image-sensing device SR is moved. This eliminates the need for the first lens group GR1 to be moved out toward the shooting target. Thus, the diameters (for example, the front lens diameter) of the first and other lens elements L1 etc. constituting the first lens group GR1 can be made comparatively small, and the optical prism PR can be made comparatively compact.

(ii) During zooming, aberrations are corrected with the movement of a plurality of movable components (the second to fourth lens groups GR2 to GR4 (GR4+SR)). This, as compared with aberration correction with the movement of the image-sensing device SR alone, permits satisfactory aberration correction.

(iii) During zooming, in particular, the movement of the fourth lens group GR4 (GR4+SR) permits efficient correction of the aberrations produced by the first to third lens groups GR1 to GR3. This increases flexibility in the design of the first to third lens groups GR1 to GR3 (for example, in the design of their curvatures and the like).

(iv) The fourth lens group GR4 and the image-sensing device SR are integrated together. This permits the variable-magnification optical system 11, and hence the lens unit 1, to be made compact.

(v) The fourth lens group GR4 includes a lens element having aspherical surfaces s20 and s21. This makes efficient aberration correction possible.

(vi) During focusing, the image-sensing device SR is moved. This eliminates the need for the first lens group GR1 to be moved out toward the shooting target. This helps reduce the aberrations resulting from the movement of the lens groups (vii) During focusing, the movement of the fourth lens group GR4 (GR4+SR) permits efficient correction of the aberrations produced by the first to third lens groups GR1 to GR3. This increases flexibility in the design of the first to third lens groups GR1 to GR3 (for example, in the design of their curvatures and the like).

(viii) During focusing, the aberrations resulting from the movement of the first to third lens groups GR1 to GR3 are reduced. This makes easy the designing of the fourth lens group GR4 in terms of aberration correction, and thus increases flexibility in the design of the fourth lens group GR4.

(ix) The variable-magnification optical system 11 (Example 2) adopts a positive-negative-positive-positive lens group arrangement. This permits the variable-magnification optical system 11, and hence the lens unit 1, to offer a high magnification-variation ratio.

(x) During zooming, the distance between the first and second lens groups GR1 and GR2 increases, the distance between the second and third lens groups GR2 and GR3 decreases, and the distance between the third and fourth lens groups GR3 and GR4 increases. This helps realize a lens unit 1 that permits increased flexibility in the movement of the lens groups.

Embodiment 3

Still another embodiment (Embodiment 3) of the present invention will be described below. Such components as function in substantially the same manners as in Embodiments 1 and 2 will be identified with common reference symbols, and their explanations will not be repeated.

Embodiments 1 and 2 have dealt with lens units 1 including lens groups GR1 to GR4 disposed in a positive-negative-positive-positive arrangement from the object side. It should be understood, however, that the present invention may be applied to any other arrangement.

1. Lens Unit

Now, a lens unit 1 adopting a different arrangement will be described below with reference to FIG. 17. The variable-magnification optical system 11 incorporated in this lens unit 11 of Embodiment 3 is referred to as Example 3. This variable-magnification optical system 11 of Example 3 is aligned along a straight line.

1-1. Lens Unit Construction

The variable-magnification optical system 11 (Example 3) of the lens unit 1, like those of Examples 1 and 2, includes, from the shooting target side (object side), a first lens group GR1, a second lens group GR2, a third lens group GR3, and a fourth lens group GR4.

1-1-1. First Lens Group

The first lens group (the most object-side lens group, the first lens group as counted from the object side) GR1 includes a first lens element L1, an optical prism PR, a second lens element L2, and a third lens element L3. The first lens group GR1 as a whole has a "negative" optical power (refractive power).

The first lens element L1 (the front lens element) is a negative meniscus lens element convex to the object side. The first lens element L1 has an aspherical surface s2.

The optical prism PR is a prism (for example, a rectangular prism) that bends at right angles the light beam incoming from the object side. The optical prism PR receives the light beam through an entrance surface s3 thereof, and lets the light beam exit therefrom through an exit surface s4 thereof.

The second lens element L2 is a negative lens element having concave surfaces on both sides. The third lens element L3 is a positive meniscus lens element convex to the object side. The second and third lens elements L2 and L3 are cemented together at the surfaces s6 and s7 thereof to form a cemented lens element.

1-1-2. Second Lens Group

The second lens group (an intermediate lens group, the second lens group as counted from the object side) GR2 includes an optical aperture stop ST, a fourth lens element L4, a fifth lens element L5, a sixth lens element L6, and a seventh lens element L7. The second lens group GR2 as a whole has a "positive" optical power.

The optical aperture stop ST, like those described earlier, is an aperture stop that permits the aperture diameter to be varied. The optical aperture stop ST is built integrally with the second lens group GR2. For the sake of convenience, in FIG. 17, the optical aperture stop ST itself is indicated as s9.

The fourth lens element L4 is a positive meniscus lens element convex to the object side. The fifth lens element L5 is a positive lens element having convex surfaces on both sides.

The sixth lens element L6 is a negative lens element having concave surfaces on both sides. The fifth and sixth lens elements L5 and L6 are cemented together at the surfaces s13 and s14 thereof to form a cemented lens element.

The seventh lens element L7 is a positive meniscus lens element concave to the object side. The seventh lens element L7 has aspherical surfaces s16 and s17.

1-1-3. Third Lens Group

The third lens group (an intermediate lens group, the third lens group as counted from the object side) GR3 includes an eighth lens element L8 and a ninth lens element L9. The third lens group GR3 as a whole has a "positive" optical power.

The eighth lens element L8 is a negative lens element having concave surfaces on both sides. The ninth lens element L9 is a positive lens element having convex surfaces on both sides. The ninth lens element L9 has aspherical surfaces s20 and s21.

1-1-4. Fourth Lens Group

The fourth lens group (the most image-side lens group, the fourth lens group as counted from the object side) GR4 includes a tenth lens element L10, a plane-parallel plate PT, and a cover glass CG. The fourth lens group GR4 as a whole has a "positive" optical power.

The tenth lens element L10 is a negative meniscus lens element convex to the object side.

The plane-parallel plate PT has two surfaces s24 and s25. This plane-parallel plate PT functions as a low-pass filter.

The cover glass CG is a glass plate having two surfaces (s26 and s27), and serves to protect the light-receiving surface of the image-sensing device SR. Accordingly, the surface s27 of the cover glass CG and the light-receiving surface of the image-sensing device SR are located very close together.

1-2. Construction Data of the Variable-Magnification Optical System (Example 3)

Tables 9 and 10 show the construction data of the variable-magnification optical system 11 of Example 3 described above. In Tables 9 and 10, the same conventions apply as in Tables 1 and 2 described earlier.

1-3. Movement of the Individual Lens Groups in the Lens Unit 1-3-1. Zooming

Now, the movement of the individual lens groups (GR1 to GR4) will be described with reference to FIG. 17. For the sake of convenience, in FIG. 17, only the axial distances (di) that vary as zooming is performed are indicated by their respective symbols; specifically, only the axial distances d8, d17, and d21 are shown.

In the lens unit 1, as zooming is performed from the wide-angle end position (W) to the telephoto end position (T), the distance between the first and second lens groups GR1 and GR2 decreases, the distance between the second and third lens groups GR2 and GR3 increases, and the distance between the third and fourth lens groups GR3 and GR4 (GR4+SR) decreases.

Specifically, in the lens unit 1, during zooming, the second lens group GR2 is moved toward the object side, and the third and fourth lens groups GR3 and GR4 (GR4+SR) are moved in a U-turn pattern toward the object side; on the other hand, meanwhile, the first lens group GR1 is kept stationary (kept in fixed positions).

Table 11 shows the amounts by which the individual lens groups (GR1 to GR4 (GR4+SR)) are moved during zooming. In Table 11, the same conventions apply as in Table 3 described earlier.

Figure 17:
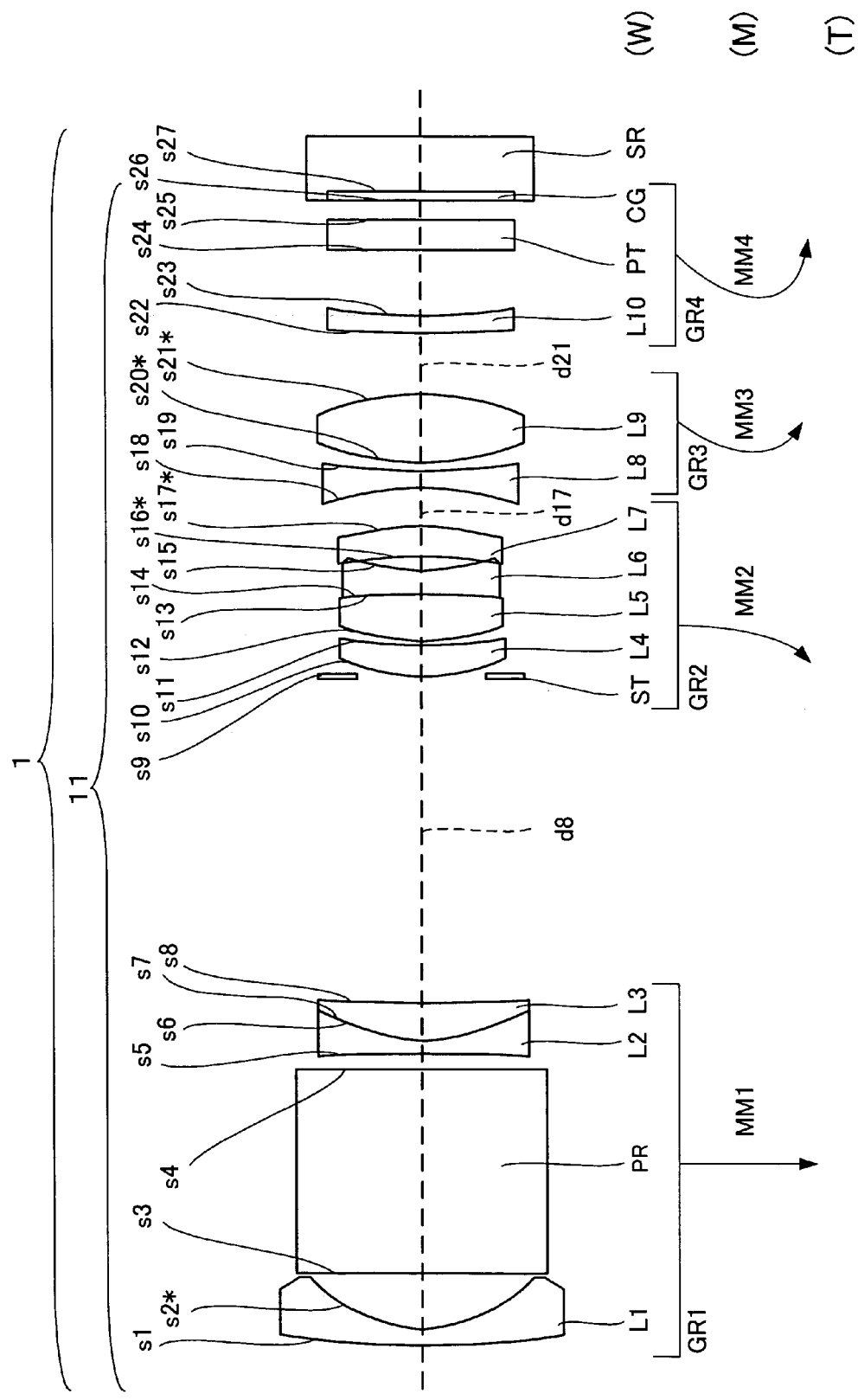
FIG. 17 is a diagram showing the lens construction of a variable-magnification optical system (Example 3) used in a lens unit according to the present invention.
Figure 18A:
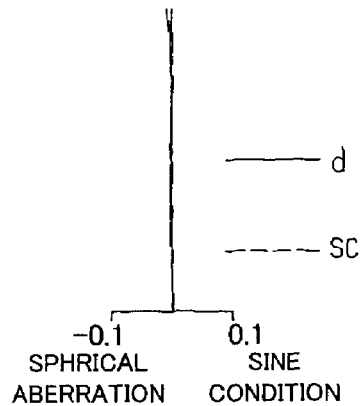
FIG. 18A is a diagram showing the spherical aberration observed in the variable-magnification optical system (Example 3) at the wide-angle end position (W)
Figure 18B:
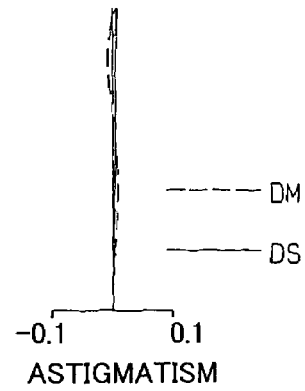
FIG. 18B is a diagram showing the astigmatism observed in the variable-magnification optical system (Example 3) at the wide-angle end position (W)
Figure 18C:
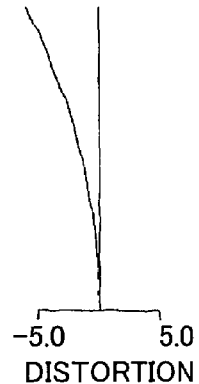
FIG. 18C is a diagram showing the distortion observed in the variable-magnification optical system (Example 3) at the wide-angle end position (W)
Figure 19A:
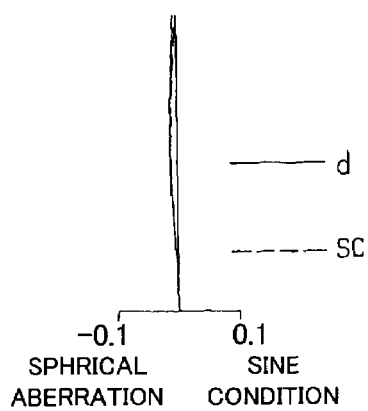
FIG. 19A is a diagram showing the spherical aberration observed in the variable-magnification optical system (Example 3) at the middle focal length position (M)
Figure 19B:
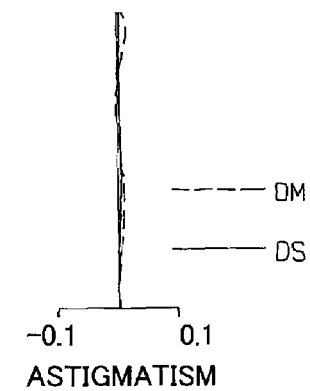
FIG. 19B is a diagram showing the astigmatism observed in the variable-magnification optical system (Example 3) at the middle focal length position (M)
Figure 19C:
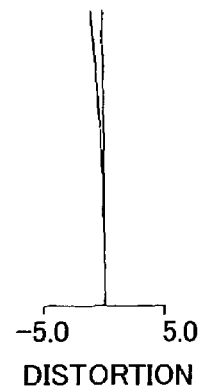
FIG. 19C is a diagram showing the distortion observed in the variable-magnification optical system (Example 3) at the middle focal length position (M)
Figure 20A:
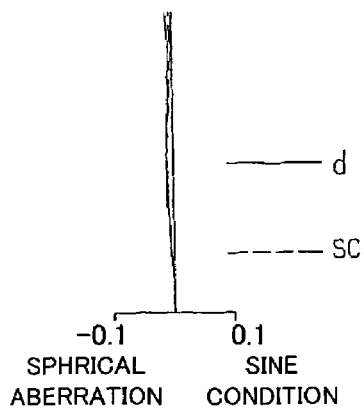
FIG. 20A is a diagram showing the spherical aberration observed in the variable-magnification optical system (Example 3) at the telephoto end position (T)
Figure 20B:
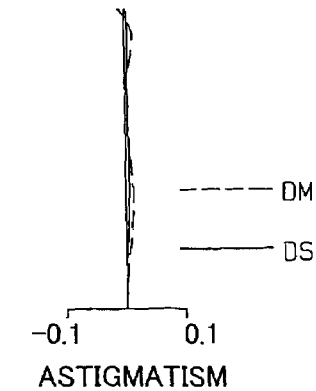
FIG. 20B is a diagram showing the astigmatism observed in the variable-magnification optical system (Example 3) at the telephoto end position (T)
Figure 20C:
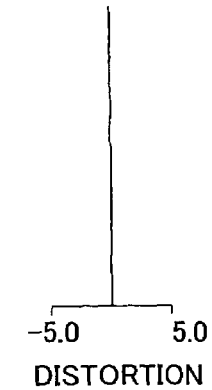
FIG. 20C is a diagram showing the distortion observed in the variable-magnification optical system (Example 3) at the telephoto end position (T)

As will be understood from Table 11 and FIG. 17, in the lens unit 1 incorporating the variable-magnification optical system 11 of Example 3, the second, third, and fourth lens groups GR2, GR3, and GR4 (GR4+SR) are movable.

FIGS. 18A to 18C, 19A to 19C, and 20A to 20C show the aberrations observed in the variable-magnification optical system 11 at different zoom positions. In these diagrams, the same conventions apply as in FIGS. 4A to 4C, 5A to 5C, and 6A to 6C.

1-3-2. Focusing

Next, focusing in the lens unit 1 will be described with reference to Table 12. In Table 12, the same conventions apply as in Table 4 described above.

As shown in Table 12, in the lens unit 1 shown in FIG. 17, during focusing at the wide-angle end position (W) and at the telephoto end position (T), while the third and fourth lens groups GR3 and GR4 (GR4+SR) are moved toward the image side, the first and second lens groups GR1 and GR2 are kept stationary.

On the other hand, in this lens unit 1, during focusing at the middle focal length position (M), while the second lens group GR2 is moved toward the object side and the third and fourth lens groups GR3 and GR4 (GR4+SR) are moved toward the image side, the first lens group GR1 is kept stationary.

FIGS. 21A to 21C, 22A to 22C, and 23A to 23C show the aberrations observed in the variable-magnification optical system 11 when focusing is achieved. In these diagrams, the same conventions apply as in FIGS. 7A to 7C, 8A to 8C, and 9A to 9C.

2. Examples of Various Features of the Present Invention

As described above, in the lens unit 1 according to the present invention, the plurality of lens groups include at least, from the object side, a first lens group GR1 having a negative optical power, a second lens group GR2 having a positive optical power, and a third lens group GR3 having a positive optical power.

In the lens unit 1 constructed as described above, during zooming from the wide-angle end position (W) to the telephoto end position (T), the distance between the first and second lens groups GR1 and GR2 is decreased, and the distance between the second and third lens groups GR2 and GR3 is increased.

In the lens unit 1 constructed as described above, the first lens group GR1 has a negative optical power, and the next, second lens group GR2 has a positive optical power. Thus, the light from the shooting target is first made to diverge by the first lens group GR1, and the resulting divergent light beam is then made to converge by the second lens group GR2.

In this case, the distance between the first and second lens groups GR1 and GR2 is decreased. Thus, in the lens unit 1, the principal point (image-side principal point) of the variable-magnification optical system 11 is located behind the second lens group GR2. This makes the focal length short relative to the previously determined total length of the lens unit 1. Consequently, the lens unit 1 according to the present invention is a wide-angle one that can receive light at wide angles.

In addition, in the lens unit 1 according to the present invention, the distance between the first and second lens groups GR1 and GR2 is decreased, and the distance between the second and third lens groups GR2 and GR3 is increased. To achieve zooming by varying the distances in that way, for example, either only one lens group (for example, the second lens group GR2) is moved, or a plurality of lens groups (for example, GR1 to GR3) are moved.

Thus, zooming can be achieved by moving the lens groups, for example GR1 to GR3, in one of many possible ways. A comparatively small number of lens groups (for example, GR2) may be involved in zooming (magnification variation), or a comparatively large number of lens groups (for example, GR1 to GR3) may be involved in zooming. Thus, according to the present invention, the lens unit 1 permits increased flexibility in the movement of the lens groups.

Although not illustrated, the lens unit 1 according to the present invention may alternatively be so constructed that the distance between the first and second lens groups GR1 and GR2 is decreased and the distance between the second and third lens groups GR2 and GR3 is decreased.

This is because, since the distance between the first and second lens groups GR1 and GR2 is decreased, the lens unit 1 can receive light at wide angles. That is, according to the present invention, even in a case where zooming is achieved by decreasing the distance between the first and second lens groups GR1 and GR2 and decreasing the distance between the second and third lens groups GR2 and GR3, the lens unit 1 can be designed as a wide-angle one that permits increased flexibility in the movement of the lens groups.

The lens unit 1 according to the present invention may include, next to the above-mentioned third lens group GR3 having a positive optical power, a fourth lens group GR4 having a negative optical power.

In the lens unit 1 constructed as described above, during zooming from the wide-angle end position (W) to the telephoto end position (T), the distance between the first and second lens groups GR1 and GR2 is decreased, the distance between the second and third lens groups GR2 and GR3 is increased, and the distance between the third and forth lens groups GR3 and GR4 is decreased.

In general, from the viewpoint of minimizing shading, it is preferable that the light that strikes the image-sensing device SR be perpendicularly incident on the light-receiving surface thereof (that is, as telecentric as possible with respect to the light-receiving surface). To achieve this, according to the present invention, next to the third lens group GR3 having a positive optical power, the fourth lens group GR4 having a negative optical power is disposed. In this case, the light that has been made convergent by passing through the third lens group GR3 having a positive optical power then passes through the fourth lens group GR4 having a negative optical power.

While passing through the fourth lens group GR4, the light is made divergent, and this permits the light to strike the light-receiving surface of the image-sensing device SR at an angle of incidence of zero ($\approx 0°$). That is, the light is then substantially perpendicularly incident on the light-receiving surface. Thus, the light having passed through the fourth lens group GR4 (a divergent beam) is more telecentric with respect to the light-receiving surface of the image-sensing device SR than is the light immediately after passing through the third lens group GR3 (a convergent beam). Consequently, according to the present invention, the lens unit 1 is a wide-angle one with minimum shading.

The lens unit 1 of Embodiment 3, like those of Embodiments 1 and 2, includes a variable-magnification optical system 11 that includes a plurality of lens groups GR1 to GR4 and an image-sensing device SR that receives the light from the shooting target through the variable-magnification optical system 11.

Of those lens groups (GR1 to GR4), the most object-side one, i.e., the first lens group GR1, includes an optical prism PR for changing the optical axis. In the lens unit 1 constructed as described above according to the present invention, during zooming, while the first lens group GR1 is kept stationary, the image-sensing device SR is moved along the optical axis AX.

Thus, the lens unit 1 of Embodiment 3 (see FIG. 17), despite adopting a different arrangement in terms of the optical powers of the lens groups, is constructed similarly to the lens units 1 of Embodiments 1 and 2 in that the first lens group GR1 is kept stationary as in Embodiments 1 and 2, in that the third lens group (an intermediate lens group) does not include an optical axis changing member (for example, a reflective mirror MR) as in Embodiment 2, in that the fourth lens group GR4 and the image-sensing device SR are moved, and in other respects.

Consequently, the lens unit 1 of Embodiment 3 offers at least the advantages stated below among those stated earlier in connection with Embodiment 1:

(i) During zooming, the image-sensing device SR is moved. This eliminates the need for the first lens group GR1 to be moved out toward the shooting target (to the object side). Thus, the diameters (for example, the front lens diameter) of the first and other lens elements L1 etc. constituting the first lens group GR1 can be made comparatively small, and the optical prism PR can be made comparatively compact.

(ii) During zooming, aberrations are corrected with the movement of a plurality of movable components (the second to fourth lens groups GR2 to GR4 (GR4+SR)). This, as compared with aberration correction with the movement of the image-sensing device SR alone, permits satisfactory aberration correction.

(iii) During zooming, in particular, the movement of the fourth lens group GR4 (GR4+SR) permits efficient correction of the aberrations produced by the first to third lens groups GR1 to GR3. This increases flexibility in the design of the first to third lens groups GR1 to GR3 (for example, in the design of their curvatures and the like).

(iv) The fourth lens group GR4 and the image-sensing device SR are integrated together. This permits the variable-magnification optical system 11, and hence the lens unit 1, to be made compact.

(v) During focusing, the image-sensing device SR is moved. This eliminates the need for the first lens group GR1 to be moved out toward the shooting target (to the object side). This helps reduce the aberrations resulting from the movement of the lens groups (vi) During focusing, the movement of the fourth lens group GR4 (GR4+SR) permits efficient correction of the aberrations produced by the first to third lens groups GR1 to GR3. This increases flexibility in the design of the first to third lens groups GR1 to GR3 (for example, in the design of their curvatures and the like).

(vii) During focusing, the aberrations resulting from the movement of the first to third lens groups GR1 to GR3 are reduced. This makes easy the designing of the fourth lens group GR4 in terms of aberration correction, and thus increases flexibility in the design of the fourth lens group GR4.

OTHER EMBODIMENTS

It should be understood that the present invention may be carried out in any manners other than specifically described thus far, and that many modifications and variations are possible within the scope and spirit of the present invention.

For example, although, in the description above, digital cameras have been dealt with as image-sensing apparatuses incorporating a lens unit according to the present invention, the present invention may be applied to any other image-sensing apparatuses, examples of which include video cameras, surveillance cameras, vehicle-mounted cameras, cameras for video phones, and cameras for intercoms.

Image-sensing apparatuses according to the present invention may also be built in digital appliances and the like, such as personal computers, mobile computers, cellular phones, and personal digital assistants (PDAs).

By building image-sensing apparatuses according to the present invention into various digital appliances, it is possible to add camera capabilities to those digital appliances. For example, it is possible to realize a digital appliance having an image capturing capability, such as a cellular phone equipped with a camera.

The above-discussed variable-magnification optical systems and image-sensing apparatuses according to the present invention may alternatively be defined as follows.

In the lens unit according to the present invention, the most image-side lens group and the image-sensing device may be moved together.

To achieve this, for example, the most image-side lens group and the image-sensing device may be built integrally. This eliminates the need for, for example, a drive power source dedicated to the movement of the most image-side lens group and one dedicated to the movement of the image-sensing device. The most image-side lens group and the image-sensing device may be integrated together in close contact to make the gap between them comparatively narrow. This helps make the lens unit more compact. Moreover, the comparatively narrow gap suffers less from intrusion of foreign objects therein.

Moreover, in the lens unit according to the present invention, during focusing, the most image-side lens group and the image-sensing device may be moved together along the optical axis.

In the lens unit according to the present invention, during focusing, while the image-sensing device is moved, for example, the most object-side lens group or at least one of the intermediate lens groups is kept stationary. Thus, according to the present invention, aberrations can be corrected to a degree comparable with the degree achieved with the image-sensing device kept stationary.

Furthermore, in the lens unit according to the present invention, for example, the movable image-sensing device and the most image-side lens group are integrated together, and the aberrations produced by the lens groups other than the most image-side lens group (namely, the most objective-side lens group and the intermediate lens groups) can be corrected effectively with the movable most image-side lens group. Thus, the lens unit according to the present invention offers increased flexibility in the design of the lens groups other than the most image-side lens group.

The most image-side lens group may include a lens element having an aspherical surface. With this construction, the lens unit can efficiently correct aberrations.

Moreover, in the lens unit according to the present invention, the plurality of lens groups may include at least, from the object side, a first lens group (i.e., the most objective-side lens group) having a positive optical power, a second lens group having a negative optical power, a third lens group having a positive optical power, and a fourth lens group having a positive optical power.

In this lens unit, during zooming from the wide-angle end position to the telephoto end position, the distance between the first and second lens groups is increased, the distance between the second and third lens groups is decreased, and the distance between the third and fourth lens groups is increased.

In the lens unit constructed as described above, the distance between the first and second lens groups is increased. Thus, the focal length of the most image-side lens group is shorter than the focal length of the variable-magnification optical system (the focal length of the entire system). Moreover, the second lens group alleviates the convergence of the light beam immediately before the light having passed through the most image-side lens group is focused. This brings the imaging point backward, and thus makes the focal length long relative to the previously determined total length of the lens unit. Consequently, the lens unit 1 according to the present invention has a comparatively high magnification (a comparatively high magnification-variation ratio).

Alternatively, in the lens unit according to the present invention, the plurality of lens groups may include at least, from the object side, a first lens group having a negative optical power, a second lens group having a positive optical power, and a third lens group GR3 having a positive optical power.

In this lens unit, during zooming from the wide-angle end position to the telephoto end position, the distance between the first and second lens groups and is decreased, and the distance between the second and third lens groups and is increased.

In the lens unit constructed as described above, the first lens group has a negative optical power, and the next (second) lens group has a positive optical power. Thus, the light from the shooting target is first made to diverge by the first lens group, and the resulting divergent light beam is then made to converge by the second lens group.

In this case, the distance between the first and second lens groups and is decreased. Thus, in the lens unit, the principal point (image-side principal point) of the variable-magnification optical system is located behind the second lens group. This makes the focal length short relative to the previously determined total length of the lens unit. Consequently, the lens unit according to the present invention is a wide-angle one that can receive light at wide angles.

In the lens unit according to the present invention, the plurality of lens groups may further include, next to the above-mentioned third lens group having a positive optical power, a fourth lens group having a negative optical power.

In this lens unit, during zooming from the wide-angle end position to the telephoto end position, the distance between the first and second lens groups and is decreased, the distance between the second and third lens groups and is increased, and the distance between the third and fourth lens groups and is decreased.

In general, from the viewpoint of minimizing shading, it is preferable that the light that strikes the image-sensing device be perpendicularly incident on the light-receiving surface thereof. To achieve this, according to the present invention, next to the third lens group having a positive optical power, the fourth lens group having a negative optical power is disposed. In this case, the light that has been made convergent by passing through the third lens group having a positive optical power is then made divergent by passing through the fourth lens group having a negative optical power.

Thus, the divergent light having passed through the fourth lens group is more telecentric with respect to the light-receiving surface of the image-sensing device than is the convergent light immediately after passing through the third lens group. Consequently, according to the present invention, the lens unit is a wide-angle one with minimum shading.

According to the present invention, an image-sensing apparatus incorporates a lens unit as described above to offer a high magnification and a wide angle.

The embodiments, examples, and the like specifically described above are merely intended to make the technical idea of the present invention clear. The present invention, therefore, should not be interpreted narrowly within the extent of what is specifically described above, but should be interpreted to allow many modifications and variations within the scope of the appended claims.

TABLE 1

| Example 1 | | Focal Length Position f[mm] FNO | | (W)~(M)~(T) 7.98~19.17~45.18 3.40~4.52~5.78 | | | |
|---|---|---|---|---|---|---|---|
| i | ri[mm] | i | di[mm] | i | Ni | vi | Element |
| 1 | 50.290 | 1 | 0.800 | 1 | 1.92286 | 20.88 | L1 GR1 |
| 2 | 23.049 | 2 | 2.300 | | | | |
| 3 | ∞ | 3 | 11.400 | 2 | 1.88300 | 40.79 | PR |
| 4 | ∞ | 4 | 0.100 | | | | |
| 5 | 39.492 | 5 | 1.825 | 3 | 1.62299 | 58.12 | L2 |
| 6 | −51.788 | 6 | 0.100 | | | | |
| 7 | 15.124 | 7 | 1.855 | 4 | 1.49700 | 81.61 | L3 |
| 8 | 79.041 | 8 | 0.601~6.314~11.006 | | | | |
| 9 | 62.108 | 9 | 0.800 | 5 | 1.77250 | 49.77 | L4 GR2 |
| 10 | 6.391 * | 10 | 2.024 | | | | |
| 11 | −7.501 | 11 | 0.700 | 6 | 1.58913 | 61.25 | L5 |
| 12 | 10.339 | 12 | 0.010 | 7 | 1.51400 | 42.83 | |
| 13 | 10.339 | 13 | 1.511 | 8 | 1.84660 | 23.78 | L6 |
| 14 | −47.554 | 14 | 11.355~5.642~0.950 | | | | |
| 15 | ∞ | 15 | 1.000 | | | | ST GR3 |
| 16 | 16.369 * | 16 | 4.810 | 9 | 1.69350 | 53.39 | L7 |
| 17 | −7.996 | 17 | 0.010 | 10 | 1.51400 | 42.83 | |
| 18 | −7.996 | 18 | 0.700 | 11 | 1.84666 | 23.78 | L8 |
| 19 | −16.577 | 19 | 0.100 | | | | |
| 20 | ∞ | 20 | 10.000 | | | | MR |
| 21 | ∞ | 21 | 1.689 | | | | |
| 22 | 27.523 | 22 | 2.018 | 12 | 1.49700 | 81.61 | L9 |
| 23 | −42.954 | 23 | 3.500 | | | | |
| 24 | −13.982 | 24 | 0.700 | 13 | 1.84666 | 23.78 | L10 |
| 25 | 35.715 | 25 | 0.641 | | | | |
| 26 | 11.744 | 26 | 2.500 | 14 | 1.81359 | 25.73 | L11 |
| 27 | 31.014 * | 27 | 1.020~9.213~18.485 | | | | |
| 28 | 38.595 * | 28 | 2.447 | 15 | 1.53048 | 55.72 | L12 GR4 |
| 29 | −17.832 * | 29 | 0.432 | | | | |
| 30 | ∞ | 30 | 0.500 | 16 | 1.51680 | 64.20 | LF |
| 31 | ∞ | 31 | 2.000 | | | | |
| 32 | ∞ | 32 | 0.500 | 17 | 1.51680 | 64.20 | CG |
| 33 | ∞ | | | | | | |

TABLE 2

| Example 1 | |
|---|---|
| Aspherical Surface Data of Surface 10 (i = 10) | |
| ε | 1.0000 |
| A4 | −0.71259357E−06 |
| A6 | −0.96542695E−05 |
| A8 | 0.14551445E−05 |
| A10 | −0.45506399E−07 |

TABLE 2-continued

Example 1

Aspherical Surface Data of Surface 16 (i = 16)

| | |
|---|---|
| ε | 1.0000 |
| A4 | −0.76551995E−04 |
| A6 | −0.15120307E−05 |
| A8 | 0.19558910E−06 |
| A10 | −0.64952426E−08 |

Aspherical Surface Data of Surface 27 (i = 27)

| | |
|---|---|
| ε | 1.0000 |
| A4 | 0.94322697E−04 |
| A6 | 0.79638893E−05 |
| A8 | −0.46161190E−06 |
| A10 | 0.98832020E−08 |

Aspherical Surface Data of Surface 28 (i = 28)

| | |
|---|---|
| ε | 1.0000 |
| A4 | −0.35458126E−03 |
| A6 | 0.47035870E−04 |
| A8 | −0.28202467E−05 |
| A10 | 0.39484035E−07 |

Aspherical Surface Data of Surface 29 (i = 29)

| | |
|---|---|
| ε | 1.0000 |
| A4 | 0.21104642E−03 |

TABLE 2-continued

Example 1

| | |
|---|---|
| A6 | 0.49241586E−04 |
| A8 | −0.35707683E−05 |
| A10 | 0.53790285E−07 |

TABLE 3

Example 1
Amount of Movement for Zooming

| Focal Length Position | TL [mm] | GR1 [mm] | GR2 [mm] | GR3 [mm] | (GR4 + SR) [mm] |
|---|---|---|---|---|---|
| W | 70.447 | 0.0000 | 0.0000 | 0.0000 | 0.0000 |
| M | 78.640 | 0.0000 | +5.7128 | 0.0000 | +8.1938 |
| T | 87.905 | 0.0000 | +10.4049 | 0.0000 | +17.4654 |

TABLE 4

Example 1
Amount of Movement for Focusing

| Closest Shootable Distance [m] | TL [mm] | GR1 [mm] | GR2 [mm] | GR3 [mm] | (GR4 + SR) [mm] |
|---|---|---|---|---|---|
| W | 0.2 | 70.888 | 0.0000 | 0.0000 | 0.0000 | +0.4391 |
| M | 0.9 | 79.237 | 0.0000 | 0.0000 | 0.0000 | +0.6014 |
| T | 0.9 | 91.396 | 0.0000 | 0.0000 | 0.0000 | +3.5313 |

TABLE 5

| Example 2 | Focal Length Position | (W)~(M)~(T) |
|---|---|---|
| | f[mm] | 5.320~9.300~15.31 |
| | FNO | 2.57~3.24~4.05 |

| i | ri[mm] | i | di[mm] | i | Ni | νi | Element | |
|---|---|---|---|---|---|---|---|---|
| 1 | 18.175 | 1 | 0.800 | 1 | 1.84666 | 23.82 | L1 | GR1 |
| 2 | 7.752 | 2 | 3.518 | | | | | |
| 3 | ∞ | 3 | 10.400 | 2 | 1.84666 | 23.82 | PR | |
| 4 | ∞ | 4 | 0.320 | | | | | |
| 5 | 33.875 | 5 | 3.258 | 3 | 1.64769 | 33.84 | L2 | |
| 6 | −13.427 | 6 | 0.705~2.674~5.020 | | | | | |
| 7 | −11.990 * | 7 | 1.500 | 4 | 1.52200 | 52.20 | L3 | GR2 |
| 8 | 5.162 * | 8 | 2.028 | | | | | |
| 9 | 9.886 | 9 | 5.000 | 5 | 1.71736 | 29.50 | L4 | |
| 10 | 26.076 | 10 | 15.694~7.284~2.389 | | | | | |
| 11 | ∞ | 11 | 0.800 | | | | ST | GR3 |
| 12 | 19.398 | 12 | 4.000 | 6 | 1.84666 | 23.78 | L5 | |
| 13 | 10.989 | 13 | 1.288 | | | | | |
| 14 | 11.847 | 14 | 3.345 | 7 | 1.48749 | 70.44 | L6 | |
| 15 | −15.384 | 15 | 0.200 | | | | | |
| 16 | 6.545 | 16 | 4.078 | 8 | 1.48749 | 70.44 | L7 | |
| 17 | 9.418 | 17 | 0.010 | 9 | 1.51400 | 42.83 | | |
| 18 | 9.418 | 18 | 1.200 | 10 | 1.84666 | 23.78 | L8 | |
| 19 | 6.401 * | 19 | 1.012~8.099~16.776 | | | | | |
| 20 | 6.009 * | 20 | 2.660 | 11 | 1.52200 | 52.20 | L9 | GR4 |
| 21 | 6.183 * | 21 | 6.660 | | | | | |
| 22 | ∞ | 22 | 1.500 | 12 | 1.51680 | 64.20 | PT | |
| 23 | ∞ | 23 | 0.700 | | | | | |
| 24 | ∞ | 24 | 0.750 | 13 | 1.51680 | 64.20 | CG | |
| 25 | ∞ | | | | | | | |

TABLE 6

Example 2

Aspherical Surface Data of Surface 7 (i = 7)

| | |
|---|---|
| $\epsilon$ | 1.0000 |
| A4 | 0.24300932E−03 |
| A6 | 0.12866981E−05 |
| A8 | −0.14751465E−06 |
| A10 | 0.24307973E−08 |

Aspherical Surface Data of Surface 8 (i = 8)

| | |
|---|---|
| $\epsilon$ | 1.0000 |
| A4 | −0.55277010E−03 |
| A6 | −0.18402576E−04 |
| A8 | 0.30852912E−06 |
| A10 | −0.53527650E−07 |

Aspherical Surface Data of Surface 19 (i = 19)

| | |
|---|---|
| $\epsilon$ | 1.0000 |
| A4 | 0.35883267E−03 |
| A6 | 0.26263261E−04 |
| A8 | −0.10573402E−05 |
| A10 | 0.12294987E−06 |

Aspherical Surface Data of Surface 20 (i = 20)

| | |
|---|---|
| $\epsilon$ | 1.0000 |
| A4 | 0.89103677E−04 |
| A6 | 0.20305702E−05 |
| A8 | 0.79507607E−06 |
| A10 | −0.57337556E−08 |

TABLE 6-continued

Example 2

Aspherical Surface Data of Surface 21 (i = 21)

| | |
|---|---|
| $\epsilon$ | 1.0000 |
| A4 | 0.86468435E−03 |
| A6 | −0.88834146E−05 |
| A8 | 0.47907940E−05 |
| A10 | 0.55713045E−08 |

TABLE 7

Example 2
Amount of Movement for Zooming

| Focal Length Position | TL [mm] | GR1 [mm] | GR2 [mm] | GR3 [mm] | (GR4 + SR) [mm] |
|---|---|---|---|---|---|
| W | 72.615 | 0.0000 | 0.0000 | 0.0000 | 0.0000 |
| M | 73.261 | 0.0000 | +1.9690 | −6.4406 | +0.6462 |
| T | 79.389 | 0.0000 | +4.3153 | −8.9900 | +6.7743 |

TABLE 8

Example 2
Amount of Movement for Focusing

| Closest Shootable Distance [m] | TL [mm] | GR1 [mm] | GR2 [mm] | GR3 [mm] | (GR4 + SR) [mm] |
|---|---|---|---|---|---|
| W | 0.23 | 72.857 | 0.0000 | 0.0000 | 0.0000 | +0.2410 |
| M | 0.23 | 74.012 | 0.0000 | 0.0000 | 0.0000 | +0.7479 |
| T | 2.35 | 79.595 | 0.0000 | 0.0000 | 0.0000 | +0.2066 |

TABLE 9

| Example 3 | Focal Length Position | (W)~(M)~(T) |
|---|---|---|
| | f[mm] | 6.25~11.67~16.49 |
| | FNO | 2.85~3.90~4.82 |

| i | ri[mm] | i | di[mm] | i | Ni | νi | Element | |
|---|---|---|---|---|---|---|---|---|
| 1 | 46.950 | 1 | 0.900 | 1 | 1.58913 | 61.25 | L1 | GR1 |
| 2 | 7.098 * | 2 | 2.764 | | | | | |
| 3 | ∞ | 3 | 10.500 | 2 | 1.84666 | 23.78 | PR | |
| 4 | ∞ | 4 | 0.652 | | | | | |
| 5 | −66.639 | 5 | 0.700 | 3 | 1.69680 | 55.46 | L2 | |
| 6 | 9.369 | 6 | 0.010 | 4 | 1.51400 | 42.83 | | |
| 7 | 9.369 | 7 | 1.875 | 5 | 1.83400 | 37.34 | L3 | |
| 8 | 156.211 | 8 | 16.944~5.840~2.034 | | | | | |
| 9 | ∞ | 9 | 0.000 | | | | ST | GR2 |
| 10 | 9.697 | 10 | 1.597 | 6 | 1.69680 | 55.46 | L4 | |
| 11 | 29.446 | 11 | 0.213 | | | | | |
| 12 | 11.869 | 12 | 2.354 | 7 | 1.69680 | 55.46 | L5 | |
| 13 | −26.453 | 13 | 0.010 | 8 | 1.51400 | 42.83 | | |
| 14 | −26.453 | 14 | 1.153 | 9 | 1.71736 | 29.50 | L6 | |
| 15 | 9.677 | 15 | 0.751 | | | | | |
| 16 | −22.251 * | 16 | 1.500 | 10 | 1.53048 | 55.72 | L7 | |
| 17 | −11.317 * | 17 | 1.974~11.027~18.460 | | | | | |
| 18 | −13.899 | 18 | 0.800 | 11 | 1.58144 | 40.89 | L8 | GR3 |
| 19 | 50.362 | 19 | 0.436 | | | | | |
| 20 | 14.525 * | 20 | 3.418 | 12 | 1.53048 | 55.72 | L9 | |
| 21 | −10.353 * | 21 | 2.945~2.285~1.808 | | | | | |
| 22 | 161.285 | 22 | 0.800 | 13 | 1.48749 | 70.44 | L10 | GR4 |
| 23 | 32.008 | 23 | 3.308 | | | | | |
| 24 | ∞ | 24 | 1.540 | 14 | 1.54426 | 69.60 | PT | |
| 25 | ∞ | 25 | 0.904 | | | | | |
| 26 | ∞ | 26 | 0.500 | 15 | 1.51680 | 64.20 | CG | |
| 27 | ∞ | | | | | | | |

TABLE 10

Example 3

Aspherical Surface Data
of Surface 2 (i = 2)

| | |
|---|---|
| $\epsilon$ | 1.0000 |
| A4 | −0.14967124E−03 |
| A6 | −0.25447780E−05 |
| A8 | −0.24656283E−07 |
| A10 | −0.16296314E−09 |
| A12 | −0.31062252E−010 |

Aspherical Surface Data
of Surface 16 (i = 16)

| | |
|---|---|
| $\epsilon$ | 1.0000 |
| A4 | −0.69818716E−03 |
| A6 | 0.11453855E−04 |
| A8 | 0.18839051E−05 |
| A10 | −0.17295598E−07 |

Aspherical Surface Data
of Surface 17 (i = 17)

| | |
|---|---|
| $\epsilon$ | 1.0000 |
| A4 | −0.10187125E−03 |
| A6 | 0.18855516E−04 |
| A8 | 0.11203563E−05 |
| A10 | 0.13935124E−07 |

Aspherical Surface Data
of Surface 20 (i = 20)

| | |
|---|---|
| $\epsilon$ | 1.0000 |
| A4 | −0.76968006E−04 |
| A6 | −0.75818390E−05 |
| A8 | 0.12331731E−05 |
| A10 | −0.67091373E−07 |
| A12 | 0.15156774E−08 |

Aspherical Surface Data
of Surface 21 (i = 21)

| | |
|---|---|
| $\epsilon$ | 1.0000 |
| A4 | 0.25926412E−03 |
| A6 | −0.13520791E−04 |
| A8 | 0.16356402E−05 |
| A10 | −0.79696221E−07 |
| A12 | 0.16296689E−08 |

TABLE 11

Example 3 Amount of Movement for Zooming

| Focal Length Position | TL [mm] | GR1 [mm] | GR2 [mm] | GR3 [mm] | (GR4 + SR) [mm] |
|---|---|---|---|---|---|
| W | 60.546 | 0.0000 | 0.0000 | 0.0000 | 0.0000 |
| M | 57.835 | 0.0000 | −11.1042 | −2.0508 | −2.7103 |
| T | 60.984 | 0.0000 | −14.9106 | +1.5752 | +0.4385 |

TABLE 12

Example 3 Amount of Movement for Focusing

| Closest Shootable Distance [m] | TL [mm] | GR1 [mm] | GR2 [mm] | GR3 [mm] | (GR4 + SR) [mm] |
|---|---|---|---|---|---|
| W | 0.15 | 61.022 | 0.0000 | 0.0000 | +0.4805 | +0.4805 |
| M | 0.15 | 59.447 | 0.0000 | −0.0001 | +1.6398 | +1.6407 |
| T | 0.15 | 64.105 | 0.0000 | 0.0000 | +3.1223 | +3.1223 |

What is claimed is:

1. A lens unit comprising:
a variable-magnification optical system including a plurality of lens groups; and
an image-sensing device that receives light having passed through the variable-magnification optical system,
wherein, of the plurality of lens groups, a most object-side lens group includes an optical axis changing member that changes an optical axis, and
wherein, during magnification variation, while the most object-side lens group is kept stationary, the image-sensing device is moved along the optical axis.

2. The lens unit of claim 1,
wherein, of the plurality of lens groups, a most image-side lens group is moved together with the image-sensing device.

3. The lens unit of claim 1,
wherein, during focusing, of the plurality of lens groups, a most image-side lens group is moved together with the image-sensing device along the optical axis.

4. The lens unit of claim 1,
wherein, of the plurality of lens groups, a most image-side lens group includes a lens element having an aspherical surface.

5. The lens unit of claim 1,
wherein the plurality of lens groups include at least, from an object side:
a first lens group having a positive optical power;
a second lens group having a negative optical power;
a third lens group having a positive optical power; and
a fourth lens group having a positive optical power, and
wherein, during magnification variation from a wide-angle end to a telephoto end, a distance between the first and second lens groups increases, a distance between the second and third lens groups decreases, and a distance between the third and fourth lens groups increases.

6. The lens unit of claim 1,
wherein the plurality of lens groups include at least, from an object side:
a first lens group having a negative optical power;
a second lens group having a positive optical power; and
a third lens group having a positive optical power, and
wherein, during magnification variation from a wide-angle end to a telephoto end, a distance between the first and second lens groups decreases, and a distance between the second and third lens groups increases.

7. The lens unit of claim 6,
wherein the plurality of lens groups further include, next to the third lens group having a positive optical power, a fourth lens group having a negative optical power, and
wherein, during magnification variation from a wide-angle end to a telephoto end, the distance between the first and second lens groups decreases, the distance between the second and third lens groups increases, and a distance between the third and fourth lens groups decreases.

8. An image-sensing apparatus comprising:
a lens unit including:
a variable-magnification optical system including a plurality of lens groups; and
an image-sensing device that receives light having passed through the variable-magnification optical system,
wherein, of the plurality of lens groups, a most object-side lens group includes an optical axis changing member that changes an optical axis, and
wherein, during magnification variation, while the most object-side lens group is kept stationary, the image-sensing device is moved along the optical axis.

* * * * *